(12) United States Patent
Ikeda et al.

(10) Patent No.: US 9,120,252 B2
(45) Date of Patent: Sep. 1, 2015

(54) MOLDED ARTICLE AND METHOD FOR PRODUCTION THEREOF

(75) Inventors: Kaoru Ikeda, Kurashiki (JP); Masakazu Nakaya, Houston, TX (US); Kazuhiro Kurosaki, Kurashiki (JP); Tomoyuki Watanabe, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 972 days.

(21) Appl. No.: 12/297,472

(22) PCT Filed: Apr. 17, 2007

(86) PCT No.: PCT/JP2007/058319
§ 371 (c)(1),
(2), (4) Date: Oct. 17, 2008

(87) PCT Pub. No.: WO2007/123108
PCT Pub. Date: Nov. 1, 2007

(65) Prior Publication Data
US 2011/0097527 A1 Apr. 28, 2011

(30) Foreign Application Priority Data

Apr. 17, 2006 (JP) .................................. 2006-113524
Apr. 24, 2006 (JP) .................................. 2006-119284
Apr. 24, 2006 (JP) .................................. 2006-119285

(51) Int. Cl.
*C08L 29/04* (2006.01)
*B29C 49/00* (2006.01)
*C08J 3/24* (2006.01)
*B29C 47/00* (2006.01)
*B29C 51/00* (2006.01)
*C08J 5/18* (2006.01)
*B29C 47/60* (2006.01)
*B32B 27/30* (2006.01)
*B29C 45/00* (2006.01)
*B29C 47/14* (2006.01)
*B29C 47/76* (2006.01)
*B29C 49/04* (2006.01)
*B29C 61/00* (2006.01)
*B29K 29/00* (2006.01)
*B29K 63/00* (2006.01)

(52) U.S. Cl.
CPC .......... *B29C 49/0005* (2013.01); *B29C 47/0004* (2013.01); *B29C 47/0021* (2013.01); *B29C 47/6056* (2013.01); *B29C 47/6062* (2013.01); *B29C 47/6093* (2013.01); *B29C 51/002* (2013.01); *B32B 27/306* (2013.01); *C08J 3/24* (2013.01); *C08J 3/248* (2013.01); *C08J 5/18* (2013.01); *C08L 29/04* (2013.01); *B29C 45/0001* (2013.01); *B29C 47/14* (2013.01); *B29C 47/767* (2013.01); *B29C 49/04* (2013.01); *B29C 61/003* (2013.01); *B29K 2029/04* (2013.01); *B29K 2063/00* (2013.01); *B29K 2995/0049* (2013.01); *B32B 2307/736* (2013.01); *B32B 2439/00* (2013.01); *B32B 2451/00* (2013.01); *B32B 2597/00* (2013.01); *B32B 2607/02* (2013.01); *C08J 2329/02* (2013.01); *C08J 2329/04* (2013.01); *Y10T 428/1379* (2015.01); *Y10T 428/31507* (2015.04); *Y10T 428/31511* (2015.04)

(58) Field of Classification Search
CPC .......... C08J 3/24; C08J 3/248; C08J 2329/04; B29K 2029/04; C08F 8/00; C08L 29/04
USPC .............. 428/36.6, 500, 515; 525/286, 330.3, 525/330.6, 385, 328.8, 387
See application file for complete search history.

(56) References Cited

U.S. PATENT DOCUMENTS

| 2004/0089388 | A1 | 5/2004 | Fujino et al. | |
| 2004/0096683 | A1* | 5/2004 | Ikeda et al. | 428/500 |
| 2005/0147778 | A1 | 7/2005 | Tai et al. | |
| 2006/0251838 | A1* | 11/2006 | Inoue et al. | 428/35.7 |
| 2009/0176937 | A1 | 7/2009 | Frank et al. | |

FOREIGN PATENT DOCUMENTS

| EP | 1 479 725 A1 | 11/2004 |
| EP | 1 801 132 A1 | 6/2007 |
| JP | 56 49734 | 5/1981 |
| JP | 62 252409 | 11/1987 |
| JP | 63 8448 | 1/1988 |

(Continued)

OTHER PUBLICATIONS

JP 3-281542, Dec. 1991, English translation.*

(Continued)

*Primary Examiner* — Robert Rabago
(74) *Attorney, Agent, or Firm* — Oblon, McClelland, Maier & Neustadt, L.L.P.

(57) ABSTRACT

A shaped article including a modified ethylene-vinyl alcohol copolymer (C), wherein the modified ethylene-vinyl alcohol copolymer (C) is a product obtained by modifying an unmodified ethylene-vinyl alcohol copolymer (A) with an epoxy compound (B) having a double bond and has a degree of modification with the epoxy compound (B) of 0.1 to 10 mol % based on the monomer units of the ethylene-vinyl alcohol copolymer (A), and at least a part of the modified ethylene-vinyl alcohol copolymer (C) is crosslinked, and the gel fraction of the shaped article is 3% by weight or more. Thereby, a shaped article which contains almost no harmful crosslinking agent and which is excellent in hot water resistance, heat resistance and a gas barrier property is provided.

54 Claims, 1 Drawing Sheet

(56) References Cited

FOREIGN PATENT DOCUMENTS

| JP | 63-8448 | * | 1/1988 |
| JP | 3-281542 | * | 12/1991 |
| JP | 3 281542 | | 12/1991 |
| JP | 5 271498 | | 10/1993 |
| JP | 9 157421 | | 6/1997 |
| JP | 9 234833 | | 9/1997 |
| JP | 2003 327619 | | 11/2003 |
| JP | 2004 161895 | | 6/2004 |
| WO | 02 092643 | | 11/2002 |
| WO | 03 072653 | | 9/2003 |
| WO | WO 2004/078606 | * | 9/2004 |

OTHER PUBLICATIONS http://en.wikipedia.org/wiki/Double_bond; Aug. 2012.*
Translation of JP 63-8448, Jan. 1988.*
Extended Search Report issued May 23, 2011 in European Patent Application No. 07741755.8-2115 2028220.
U.S. Appl. No. 12/776,598, filed May 10, 2010, Ikeda, et al.

* cited by examiner

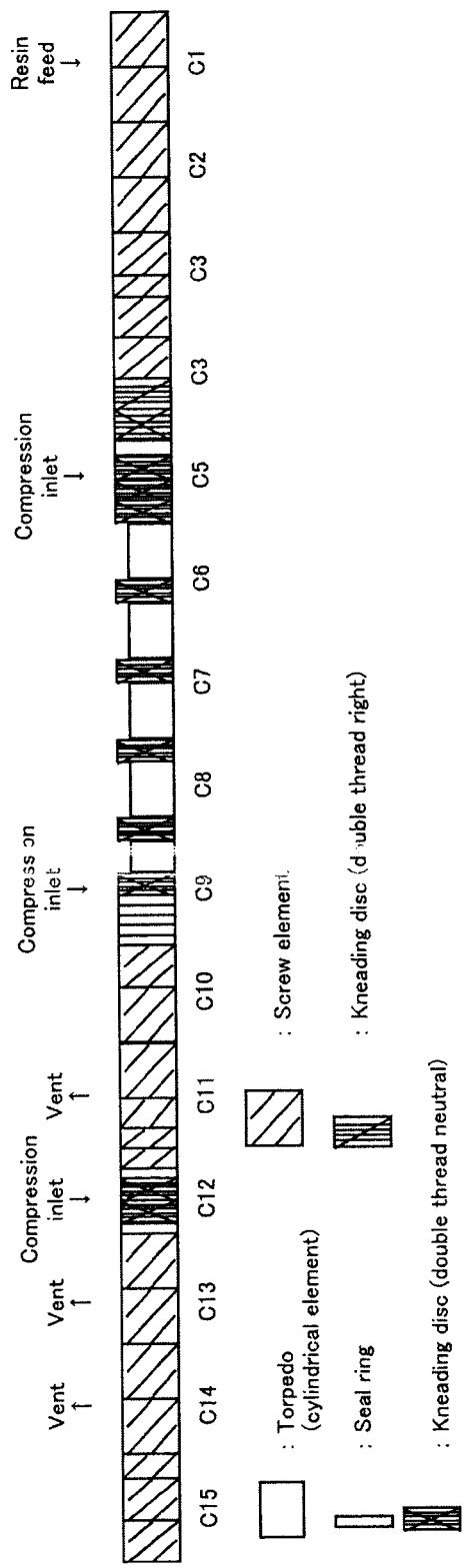

MOLDED ARTICLE AND METHOD FOR PRODUCTION THEREOF

This application is a 371 of PCT/JP2007/058319 filed Apr. 17, 2007. Priority to Japanese patent applications 2006-113524, filed Apr. 17, 2006; 2006-119284, filed Apr. 24, 2006; and 2006-119285, filed Apr. 24, 2006, are claimed.

TECHNICAL FIELD

The present invention relates to shaped articles excellent in hot water resistance, heat resistance, and gas barrier property. Particularly, it relates to shaped articles comprising a modified ethylene-vinyl alcohol copolymer or a resin composition containing the same. The invention also relates to methods of producing such shaped articles.

BACKGROUND ART

An ethylene-vinyl alcohol copolymer, which may hereinafter be referred to as an EVOH, has a considerably smaller oxygen transmission rate than other plastics and is of good melt shapability. Therefore, it is widely used as food packaging materials. It has recently been used for applications other than food containers such as fuel tanks of automobiles and containers of agrochemicals, because of its chemical resistance and small permeability of various chemicals. However, there is a problem that when a packaging material containing an EVOH is used for applications where retort treatment under high temperature and high humidity is performed, whitening, deformation or deterioration in barrier property occurs.

In order to improve such hot water resistance and the like, various methods have been proposed with regard to a technique of crosslinking an EVOH. For example, Patent document 1 discloses that a compound having an epoxy group and an allyl group is incorporated into an EVOH and then crosslinking is performed by application of light or heat. However, judging from the hot water breakage temperature in Examples of Patent document 1, only a small effect is obtained and almost no crosslinkage seems to be formed. It is conceivable that this is caused by the fact that almost no epoxy group has reacted with the EVOH. Moreover, in producing the compound, it is necessary to add a large amount of a compound having an epoxy group and an allyl group. Therefore, it is feared that this compound remains and it will cause health problems particularly when the material is used for food packaging containers.

Patent document 2 and Patent document 3 describe adding at least one crosslinking agent and crosslinking aid selected from among multifunctional allyl compounds, multifunctional (meth)acrylic compounds, polyhydric alcohols and metal oxides to an EVOH and irradiating it with an electron beam to crosslink. However, this is also feared to have health problems caused by remaining of additives. Moreover, the crosslinking agent reacts with an EVOH in the course of melt-kneading to cause gelation. Therefore, there is a problem with prolonged operation.

Patent document 4 describes adding a compound having two or more allyl ether groups to an EVOH and irradiating it with an electron beam to crosslink. However, this also appears to have health problems caused by remaining of additives.

Patent document 5 describes a method in which triallyl cyanurate and triallyl isocyanurate are used as crosslinking agents and these are melt-kneaded with an EVOH and then the EVOH is crosslinked by irradiation with an electron beam. However, the triallyl cyanurate and the triallyl isocyanurate will remain. Therefore, there is a fear of health problems particularly in use for food packaging containers. Moreover, the triallyl cyanurate and the triallyl isocyanurate react with an EVOH in the course of melt-kneading to cause gelation. Therefore, there is a problem with prolonged operation.

Patent document 6 describes a method of crosslinking an EVOH film by bringing it into contact with water to make it containing water and then irradiating it with an electron beam. However, in this method, it is necessary to immerse a film in water for a long time, and therefore there is a problem that it is difficult to perform high-speed production.

Patent document 7 describes to cause a specific epoxy compound to react with an EVOH to modify it, thereby improving its flexibility while maintaining its gas barrier property as much as possible. However, there is a drawback that the modification leads to a significant drop of melting point, and therefore it is difficult to use that as it is in applications where heat resistance is required. Patent document 8 describes a resin composition comprising a modified EVOH described in Patent document 7 and an unmodified EVOH.

Patent document 1: JP 63-8448 A
Patent document 2: JP 5-271498 A
Patent document 3: JP 9-157421 A
Patent document 4: JP 9-234833 A
Patent document 5: JP 62-252409 A
Patent document 6: JP 56-49734 A
Patent document 7: WO 02/092643
Patent document 8: WO 03/072653

DISCLOSURE OF THE INVENTION

Problems to be Solved by the Invention

The present invention has been accomplished in order to solve the above-described problems. One object of the invention is to provide a shaped article which contains almost no harmful crosslinking agent and which is excellent in hot water resistance, heat resistance and gas barrier property. Another object is to provide a production method which is suitable for producing such shaped articles.

Means for Solving the Problems

The above-mentioned object is attained by providing a shaped article comprising a modified ethylene-vinyl alcohol copolymer (C), wherein the modified ethylene-vinyl alcohol copolymer (C) is a product obtained by modifying an unmodified ethylene-vinyl alcohol copolymer (A) with an epoxy compound (B) having a double bond, a degree of modification with the epoxy compound (B) is 0.1 to 10 mol % based on the monomer units of the ethylene-vinyl alcohol copolymer (A), at least a part of the modified ethylene-vinyl alcohol copolymer (C) is crosslinked, and a gel fraction of the shaped article is 3% by weight or more.

The problems are solved also by providing a shaped article comprising a resin composition containing a modified ethylene-vinyl alcohol copolymer (C) and an unmodified ethylene-vinyl alcohol copolymer (D), wherein the modified ethylene-vinyl alcohol copolymer (C) is a product obtained by modifying an unmodified ethylene-vinyl alcohol copolymer (A) with an epoxy compound (B) having a double bond, a degree of modification with the epoxy compound (B) is 0.1 to 10 mol % based on the monomer units of the ethylene-vinyl alcohol copolymer (A), at least a part of the modified ethylene-vinyl alcohol copolymer (C) is crosslinked, and a gel fraction of the shaped article is 3% by weight or more.

In the aforementioned shaped articles, it is preferable that the unmodified ethylene-vinyl alcohol copolymer (A) has an ethylene content of 5 to 55 mol % and a degree of saponification of 90% or more. It is also preferable that the epoxy compound (B) having a double bond is a monofunctional epoxy compound having a molecular weight of 500 or less, especially allyl glycidyl ether.

In the aforementioned shaped articles, it is also preferable that the modified ethylene-vinyl alcohol copolymer (C) is a product obtained by modifying the unmodified ethylene-vinyl alcohol copolymer (A) with the epoxy compound (B) having a double bond and an epoxy compound (E) having no double bond, a degree of modification with the epoxy compound (B) is 0.1 to 10 mol % based on the monomer units of the ethylene-vinyl alcohol copolymer (A), and a degree of modification with the epoxy compound (E) is 0.1 to 30 mol % based on the monomer units of the ethylene-vinyl alcohol copolymer (A). It is also preferable that the gel fraction is 10% by weight or more.

Preferable embodiments of the shaped articles of the present invention include an extrusion molded article, a film or a sheet (especially, a stretched film or a heat shrinkable film), a thermoformed article, a wallpaper or a decorative board, a pipe or a hose, a profile extruded article, an extrusion blow molded article, an injection molded article, a flexible packaging material, and a container (especially, a retort packaging container). A package produced by filling a content into the container and then performing heat sterilization treatment is also a preferable embodiment.

A shaped article of the present invention preferably comprises a multilayer structure having a layer comprising the modified ethylene-vinyl alcohol copolymer (C) and a layer comprising a resin (F) other than the (C). A shaped article of the present invention preferably comprises a multilayer structure having a layer comprising a resin composition containing the modified ethylene-vinyl alcohol copolymer (C) and the unmodified ethylene-vinyl alcohol copolymer (D), and a layer comprising a resin (F) other than the resin composition. In these multilayer structures, it is preferable that the resin (F) is at least one selected from the group consisting of polyolefin, polyamide, polyester, polystyrene, polyurethane, polyvinylidene chloride, polyvinyl chloride, polyacrylonitrile, polycarbonate, an acrylic resin and a polyvinyl ester. It is also preferable that the resin (F) is an elastomer.

Preferable embodiments of the shaped articles comprising the multilayer structure include a coextruded film or a coextruded sheet, a heat shrinkable film, a multilayer pipe (especially, a fuel pipe or a pipe for hot water circulation), a multilayer hose (especially, a fuel hose), a multilayer container (especially, a coextrusion blow molded container, a coinjection molded container, and a retort packaging container). A package produced by filling a content into the container and then performing heat sterilization treatment is also a preferable embodiment.

The aforementioned problems are solved also by providing a method for producing a shaped article comprising a modified ethylene-vinyl alcohol copolymer (C), wherein the method includes modifying an unmodified ethylene-vinyl alcohol copolymer (A) with an epoxy compound (B) having a double bond to produce a modified ethylene-vinyl alcohol copolymer (C), shaping the modified ethylene-vinyl alcohol copolymer (C) to obtain a shaped article, and then crosslinking at least a part of the modified ethylene-vinyl alcohol copolymer (C) to make the shaped article have a gel fraction of 3% by weight or more.

The aforementioned problems are solved also by providing a method for producing a shaped article comprising a resin composition containing a modified ethylene-vinyl alcohol copolymer (C) and an unmodified ethylene-vinyl alcohol copolymer (D), wherein the method includes modifying an unmodified ethylene-vinyl alcohol copolymer (A) with an epoxy compound (B) having a double bond to produce a modified ethylene-vinyl alcohol copolymer (C), producing a resin composition by mixing the modified ethylene-vinyl alcohol copolymer (C) and the unmodified ethylene-vinyl alcohol copolymer (D), shaping the resin composition to obtain a shaped article, and then crosslinking at least apart of the modified ethylene-vinyl alcohol copolymer (C) to make the shaped article have a gel fraction of 3% by weight or more.

It is preferable in the production method that the unmodified ethylene-vinyl alcohol copolymer (A) has an ethylene content of 5 to 55 mol % and a degree of saponification of 90% or more. It is also preferable that the epoxy compound (B) having a double bond is a monofunctional epoxy compound having a molecular weight of 500 or less, especially allyl glycidyl ether.

It is preferable in the production method that the modified ethylene-vinyl alcohol copolymer (C) is a product obtained by modifying the unmodified ethylene-vinyl alcohol copolymer (A) with the epoxy compound (B) having a double bond and an epoxy compound (E) having no double bond, a degree of modification with the epoxy compound (B) is 0.1 to 10 mol % based on the monomer units of the ethylene-vinyl alcohol copolymer (A), and a degree of modification with the epoxy compound (E) is 0.1 to 30 mol based on the monomer units of the ethylene-vinyl alcohol copolymer (A).

It is preferable in the production method that the unmodified ethylene-vinyl alcohol copolymer (A) is modified in the presence of both the epoxy compound (B) having a double bond and the epoxy compound (E) having no double bond. It is also preferable that the modification is performed in the presence of a catalyst. It is also preferable that the content of an alkali metal salt in the unmodified ethylene-vinyl alcohol copolymer (A) is 50 ppm or less in terms of metal element. It is also preferable that the content of an alkaline earth metal salt in the unmodified ethylene-vinyl alcohol copolymer (A) is 20 ppm or less in terms of metal element. It is also preferable that the epoxy compound (B) is an epoxy compound having 4 to 10 carbon atoms. It is preferable that a reaction between the unmodified ethylene-vinyl alcohol copolymer (A) and the epoxy compound (B) is performed in an extruder. It is more preferable that the epoxy compound (B) is added to the unmodified ethylene-vinyl alcohol copolymer (A) in a molten state in the extruder.

It is preferable in the aforementioned production method that at least a part of the modified ethylene-vinyl alcohol copolymer (C) is crosslinked by irradiating with at least one kind of ray selected from the group consisting of electron beam, X-radiation, γ-radiation, ultraviolet radiation and visible radiation, or by heating. At this time, it is preferable that an electron beam is irradiated so that the absorbed dose thereof will be 1 kGy or more, more preferably 5 to 500 kGy.

That is, the objects of the present invention are preferably attained by the following methods. First, a compound having both an epoxy group and a double bond is caused to react with an EVOH. At this time, it is preferable to perform the reaction by heating in the presence of a catalyst, and then deactivate the catalyst with an additive, and remove an excess portion of the epoxy compound having a double bond. In such a way, a modified EVOH having a double bond is produced. It is preferable to shape this by melting or solution coating and then crosslink it by irradiating with at least one kind of ray selected from electron beam, X-radiation, 7-radiation, ultraviolet radiation and visible radiation, or by heating. By a way described above, a shaped article comprising a modified EVOH is provided. A shaped article is also provided by shaping and crosslinking a resin composition prepared by blending an unmodified EVOH to a modified EVOH having a double bond in a similar way.

Effect of the Invention

The shaped articles of the present invention contain almost no harmful crosslinking agent and are excellent in hot water resistance, heat resistance and gas barrier property. The production methods of the present invention are suitable also for prolonged high-speed production in producing such shaped articles.

BRIEF DESCRIPTION OF THE DRAWING

FIG. 1 A schematic view of the constitution of the extruder used for the production of modified EVOHs in Synthesis Examples.

BEST MODE FOR CARRYING OUT THE INVENTION

A modified EVOH (C) to be used in the present invention is a product obtained by causing an epoxy compound (B) having a double bond to react with the hydroxyl groups of an unmodified EVOH (A).

The ethylene content of the unmodified EVOH (A) to be used in the present invention is preferably 5 to 55 mol %, more preferably 20 to 55 mol %, and even more preferably 25 to 50 mol %. When the ethylene content is less than 5 mol %, the water resistance is poor, and when the ethylene content is more than 60 mol %, the gas barrier property is poor. The ethylene content of the resulting modified EVOH (C) is equal to that of the starting EVOH (A).

The degree of saponification of the unmodified EVOH (A) is preferably 90 mol % or more, more preferably 98 mol % or more, and even more preferably 99 mol % or more. When the degree of saponification is less than 90 mol %, the gas barrier property and the thermal stability are poor.

As described later, the modified EVOH (C) of the present invention is obtained preferably by carrying out a reaction between an EVOH (A) and an epoxy compound (B) having a double bond in an extruder. During the reaction, the EVOH is exposed to a heating condition. If the EVOH (A) contains an excess amount of an alkali metal salt and/or an alkaline earth metal salt at this time, the resulting modified EVOH (C) may suffer from coloration. Problems such as decrease in viscosity of the modified EVOH (C) may arise, resulting in deterioration of shapability thereof. In addition, when a catalyst is used as described later, it is preferable that the added amount of such a salt be as small as possible because it will deactivate the catalyst.

In order to avoid the above-mentioned problem, it is preferable that the amount of the alkali metal salt contained in the EVOH (A) is 50 ppm or less in terms of metal element. In a more preferable embodiment, the amount of the alkali metal salt contained in the EVOH (A) is 30 ppm or less, and more preferably 20 ppm or less in terms of metal element. From the same viewpoint, the amount of the alkaline earth metal salt contained in the EVOH (A) is preferably 20 ppm or less, more preferably 10 ppm or less, and even more preferably 5 ppm or less in terms of metal element. It is most preferable that substantially no alkaline earth metal salt is contained in the EVOH (A).

A preferable melt flow rate (MFR) (measured at 190° C. under a load of 2160 g) of the unmodified EVOH (A) for use in the present invention is 0.1 to 100 g/10 min, preferably 0.3 to 30 g/10 min, and more preferably 0.5 to 20 g/10 min. When a melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C. Two or more EVOHs (A) differing in MFR may be used in combination.

The epoxy compound (B) having a double bond to be used in the present invention is preferably one having one epoxy group and one or more double bonds in the molecule. In other words, it is preferably a monofunctional epoxy compound. Moreover, one having a molecular weight of 500 or less is preferable. Epoxy compounds having two or more epoxy groups will problematically form a crosslinkage in the case of modification. The kind of the double bond is particularly preferably a vinyl group, which is a monosubstituted olefin, and the next preferable one is a vinylene group or a vinylidene group, which are disubstituted olefins. The next preferable is trisubstituted olefins. Tetrasubstituted olefins are not suitable for the objects of the present invention because of their poor reactivity.

The epoxy compound (B) having a double bond is preferably one an excessively added portion of which can be removed from an EVOH easily. A practically available method for the removal is to remove it by volatilizing it from a vent of an extruder. Therefore, it is preferable that the boiling point is 250° C. or lower, and more preferably 200° C. or lower. In addition, the epoxy compound (B) preferably has 4 to 10 carbon atoms. Specific examples of such epoxy compounds having a double bond include 1,2-epoxy-3-butene, 1,2-epoxy-4-pentene, 1,2-epoxy-5-hexene, 1,2-epoxy-4-vinylcyclohexane, allyl glycidyl ether, methallyl glycidyl ether, and ethylene glycol allyl glycidyl ether. Particularly preferred is allyl glycidyl ether. It is also possible to remove through a vent of an extruder by washing with water. In this case, it is also preferable that the epoxy compound (B) is soluble in water.

While the conditions of the reaction of an epoxy compound (B) having a double bond and an unmodified EVOH (A) are not particularly restricted, it is preferable, like the method described in WO 02/092643 (Patent document 7), to cause the epoxy compound (B) having a double bond to react with the unmodified EVOH (A) in an extruder. At this time, it is preferable to add a catalyst and, in this case, it is preferable to add a carboxylate as a deactivator after the reaction. Adding an epoxy compound (B) to an unmodified EVOH (A) in a molten state in an extruder is preferred because it is possible to prevent the epoxy compound (B) from evaporation and to control the reaction amount easily. The epoxy compound (B) having a double bond added excessively can be removed through a vent of the extruder. Furthermore, by washing the resulting pellets with warm water, it is possible to remove the remaining epoxy compound (B) and also possible to remove the remaining catalyst.

The catalyst to be used in the present invention is preferably one containing an ion of a metal which belongs to any of Groups 3 to 12 of the periodic table. What is the most important for the metal ion used for the catalyst is to have a moderate Lewis acidity. From this standpoint, ions of metals which belong to any of Groups 3 to 12 of the periodic table are used. Among these, ions of metals which belong to Group 3 or 12 of the periodic table are preferable due to their moderate Lewis acidities; ions of zinc, yttrium and gadolinium are more preferable. In particular, a catalyst containing a zinc ion is most suitable because it has an extremely high catalytic activity and a resulting modified EVOH (C) is superior in thermostability.

The added amount of the ion of a metal which belongs to any of Groups 3 to 12 of the periodic table is preferably 0.1 to 20 μmol/g in terms of molar number of metal ions based on the weight of the unmodified EVOH (A). When too much ion is added, the EVOH may gelate during its melt-kneading. Therefore, the amount of the ion is more preferably 10 μmol/g or less. On the other hand, when too small an amount of ion is added, no satisfactory effect of the addition of the catalyst may be obtained. Therefore, the amount of the ion is more preferably 0.5 μmol/g or more. It is to be noted that an appropriate amount of the ion of a metal which belongs to Groups 3 to 12 of the periodic table may vary depending upon the kind of the metal to be employed and the kind of the anion described later and, therefore, should be adjusted appropriately in view of these factors.

The anion species in the catalyst containing an ion of a metal which belongs to any of Groups 3 to 12 of the periodic table is not particularly limited, but it is preferable to contain a monovalent anion the conjugate acid of which is a strong acid as strong as or stronger than sulfuric acid. This is because an anion the conjugate acid of which is a strong acid is usually hard to react with an epoxy compound because of its low nucleophilicity and the anion can prevent loss of catalytic activity caused by consumption of anionic species through a nucleophilic reaction. In addition, that is also because when having such an anion as a counter ion, the catalyst has an improved Lewis acidity and, therefore, its catalytic activity is improved.

Examples of the monovalent anion the conjugate acid of which is a strong acid as strong as or stronger than sulfuric acid include sulfonate ions such as methanesulfonate ion, ethanesulfonate ion, trifluoromethanesulfonate ion, benzenesulfonate ion and toluenesulfonate ion; halogen ions such as chloride ion, bromide ion and iodide ion; perchlorate ions; anions having four or more fluorine atoms such as tetrafluoroborate ion ($BF_4^-$), hexafluorophosphate ion (PFC), hexafluoroarsinate ion ($AsF_6^-$) and hexafluoroantimonate ion; ions of tetraphenyl borate derivatives such as tetrakis (pentafluorophenyl) borate ion; and ions of carborane derivatives such as tetrakis(3,5-bis(trifluoromethyl)phenyl)borate, bis(undecahydride-7,8-dicarbaundecaborate) cobalt (III) ion, and bis(undecahydride-7,8-dicarbaundecaborate) iron (III) ion.

When using a catalyst containing an anionic species such as hexafluorophosphate or tetrafluoroborate among the anionic species mentioned above, the anion species itself is thermostable and has a very low nucleophilicity. However, the anion species may react with a hydroxyl group in an EVOH to form hydrogen fluoride to cause a bad influence on the thermostability of a resin. In addition, carborane derivative ions of cobalt or the like do not react with an EVOH and their anionic species themselves are thermostable. However, they are very expensive.

A sulfonate ion is preferable as the anionic species of the catalyst because it does not react with an EVOH, it is thermostable as an anionic species itself and also it is appropriately priced. Examples of suitable sulfonate ions include methanesulfonate ion, trifluoromethanesulfonate ion, benzenesulfonate ion and toluenesulfonate ion. Trifluoromethanesulfonate ion is most suitable.

As described above, it is preferable that the catalyst used in the present invention contains a monovalent anion the conjugate acid of which is a strong acid as strong as or stronger than sulfuric acid, but it is not necessary that all the anionic species in the catalyst are the same anionic species. It is rather desirable that the catalyst also contains an anion the conjugate acid of which is a weak acid.

Examples of the anion the conjugate acid of which is a weak acid include alkyl anion, aryl anion, alkoxide, aryloxy anion, carboxylate and acetylacetonato and its derivatives. Particularly, alkoxide, carboxylate and acetylacetonato and its derivatives are suitably employed.

It is preferable that the molar number of the anion the conjugate acid of which is as strong as or stronger than sulfuric acid is 0.2 to 1.5 times the molar number of the metal ions in the catalyst. When the above-mentioned molar ratio is less than 0.2 times, the catalytic activity may be insufficient. The molar ratio is more preferably 0.3 times or more, and even more preferably 0.4 times or more. On the other hand, when the above-mentioned molar ratio exceeds 1.5 times, the EVOH may gelate. The molar ratio is more preferably 1.2 times or less. The molar ratio is most preferably 1 time. In addition, when the unmodified EVOH (A), which is a raw material, contains an alkali metal salt such as sodium acetate, the molar number of the anion the conjugate acid of which is as strong as or stronger than sulfuric acid may be increased by an amount corresponding to the anion neutralized and consumed by the salt.

The method for preparing the catalyst is not limited particularly, but an example of a preferable method is a method in which a compound of a metal which belongs to any of Groups 3 to 12 of the periodic table is dissolved or dispersed in a solvent and then a strong acid, such as sulfonic acid, the conjugate acid of which is as strong as or stronger than sulfuric acid is added to the resulting solution or suspension. Examples of the compound of a metal which belongs to any of Groups 3 to 12 of the periodic table to be used as a raw material include alkyl metal, aryl metal, metal alkoxide, metal aryloxide, metal carboxylate and metal acetylacetonato. When the strong acid is added to the solution or suspension of the compound of a metal which belongs to any of Groups 3 to 12 of the periodic table, it is preferable that the strong acid is added in small portions. The thus obtained solution containing the catalyst may be introduced directly into an extruder.

As the solvent in which the compound of the metal which belongs to any of Groups 3 to 12 of the periodic table is dissolved or dispersed, organic solvents, especially ether solvents, are preferable. This is because these are hard to react even at a temperature in the extruder and at the same time they have good solubility of the metal compound. Examples of the ether solvents include dimethyl ether, diethyl ether, tetrahydrofuran, dioxane, 1,2-dimethoxyethane, diethoxyethane, diethylene glycol dimethyl ether and triethylene glycol dimethyl ether. As a solvent to be used, preferred are those which are superior in solubility of metal compounds, are of relatively low boiling point, and can be removed almost completely through a vent in an extruder. From this standpoint, diethylene glycol dimethyl ether, 1,2-dimethoxyethane and tetrahydrofuran are particularly preferable.

In addition, in the above-mentioned method for the preparation of the catalyst, an ester of a strong acid (e.g., a sulfonate) may be used instead of the strong acid to add. The ester of a strong acid may cause no reaction with the metal compound at room temperature because it generally has reactivity lower than that of the strong acid itself. However, when it is introduced into an extruder of high temperature which is held at about 200° C., a catalyst having an activity in the extruder can be formed.

As a method for preparing the catalyst, the alternative method described below may be adopted. First, a water-soluble compound of a metal which belongs to any of Groups 3 to 12 of the periodic table and a strong acid, such as sulfonic acid, the conjugate acid of which is as strong as or stronger than sulfuric acid are mixed in an aqueous solution to form an aqueous catalyst solution. At this time, the aqueous solution may contain an appropriate amount of an alcohol. An EVOH containing the catalyst can be obtained by bringing the resulting aqueous catalyst solution into contact with the EVOH and then drying. Specifically, a preferable method is one in which pellets of the unmodified EVOH (A), especially porous hydrous pellets, are immersed in the aqueous catalyst solution. In this case, the dry pellets thus obtained may be introduced into an extruder.

The catalyst deactivator to be used may be any one which is able to reduce the activity of the catalyst as a Lewis acid and the kind thereof is not particularly restricted. Alkali metal salts are suitably employed. To deactivate a catalyst containing a monovalent anion the conjugate acid of which is a strong acid as strong as or stronger than sulfuric acid, it is required to use an alkali metal salt containing an anion of an acid which is weaker than the conjugate acid of the monovalent anion. This is because when doing so, a counter ion of the ion of a metal belonging to any of Groups 3 to 12 of the periodic table which constitutes the catalyst is replaced with an ion of a weaker acid, resulting in reduction in the Lewis acidity of the catalyst. The cationic species of the alkali metal salt to be used for the catalyst deactivator is not limited particularly and suitable examples thereof include sodium salts, potassium salts and lithium salts. The anionic species is not also limited particularly and suitable examples thereof include carboxylates, phosphates and phosphonates.

Even if a salt such as sodium acetate or dipotassium hydrogenphosphate is used as the catalyst deactivator, the thermostability is improved considerably but may be insufficient depending upon the application. This is likely to be because the ion of the metal which belongs to any of Groups 3 to 12 of the periodic table still has some activity as a Lewis acid and, therefore, can serve as a catalyst with respect to decomposition and gelation of a modified EVOH. As a method for further improving in this respect, it is desirable to add a chelating agent which strongly coordinates to an ion of a metal which belongs to any of Groups 3 to 12 of the periodic table. Such a chelating agent can coordinate to the metal ion strongly and, as a result, it can eliminate the Lewis acidity of the ion almost completely and can provide a modified EVOH (C) superior in thermostability. In addition, when the chelating agent is an alkali metal salt, it can also neutralize a strong acid which is a conjugate acid of an anion contained in the catalyst as described previously.

Examples of suitable chelating agents to be used as the catalyst deactivator include oxycarboxylates, aminocarboxylates and aminophosphonates. Specific examples of the oxycarboxylates include disodium citrate, disodium tartrate and disodium malate. Examples of the aminocarboxylates include trisodium nitrilotriacetate, disodium ethylenediaminetetraacetate, trisodium ethylenediaminetetraacetate, tripotassium ethylenediaminetetraacetate, trisodium diethylenetriaminepentaacetate, trisodium 1,2-cyclohexanediaminetetraacetate, monosodium ethylenediaminediacetate, monosodium N-(hydroxyethyl)iminodiacetate. Examples of the aminophosphonates include hexasodium nitrilotrismethylenephosphonate and octasodium ethylenediaminetetra(methylenephosphonate). Above all, polyaminopolycarboxylic acids are suitable and alkali metal salts of ethylenediaminetetraacetic acid are most suitable in view of performance and cost.

The amount of the catalyst deactivator to be added is not limited particularly and may be adjusted appropriately depending upon the kind of the metal ion contained in the catalyst and the number of coordination sites of the chelating agent. It is suitable to set the amount so that the ratio of the molar number of the catalyst deactivator to the molar number of the metal ion contained in a catalyst may become 0.2 to 10. When the ratio is less than 0.2, a catalyst may not be deactivated sufficiently; the ratio is more preferably 0.5 or more, and even more preferably 1 or more. On the other hand, when the ratio exceeds 10, a resulting modified EVOH may get colored and the production cost may increase; the ratio is more preferably 5 or less, and even more preferably 3 or less.

The method for introducing the catalyst deactivator into an extruder is not limited particularly, but in order to disperse it uniformly, it is preferable to introduce the catalyst deactivator in the form of a solution thereof to a modified EVOH in a molten state. In view of the solubility of the catalyst deactivator, the influence to the peripheral environment and the like, it is preferable to add it in the form of an aqueous solution.

The position where the catalyst deactivator is added to the extruder may be any position where the unmodified EVOH (A) and the epoxy compound (B) having a double bond have been melt-kneaded in the presence of a catalyst. However, it is preferable to add the catalyst deactivator after melt-kneading the EVOH (A) and the epoxy compound (B) in the presence of a catalyst and then removing an unreacted epoxy compound (8). This is because in the case of adding a catalyst deactivator in the form of an aqueous solution as described previously, addition of the catalyst deactivator before the removal of an unreacted epoxy compound (B) will result in incorporation of water into an epoxy compound (B) which is removed through a vent or the like and used after recovery, causing separation operations to require much labor. In addition, it is also preferable to remove moisture through a vent or the like after addition of the aqueous solution of the catalyst deactivator.

In the production method of the present invention, an example of a suitable production process using a catalyst deactivator is a process including the steps of:

(1) melting an unmodified EVOH (A);

(2) adding a mixture of an epoxy compound (B) having a double bond and a catalyst;

(3) removing an unreacted epoxy compound (B);

(4) adding an aqueous solution of a catalyst deactivator; and (5) removing moisture under reduced pressure.

From the viewpoint of performing a reaction smoothly, it is preferable to remove moisture and oxygen from the system. For this purpose, moisture and oxygen may be removed through a vent or the like before the addition of the epoxy compound (B) to the extruder.

The degree of modification of the modified EVOH (C) with the epoxy compound (B) having a double bond is within the range of 0.1 to 10 mol %, preferably within the range of 0.3 to 5 mol %, and more preferably within the range of 0.5 to 3 mol % based on the monomer units of the unmodified EVOH (A). When the degree of modification is less than 0.1 mol %, only a little effect of modification is obtained, and when it exceeds 10 mol %, there is a defect that the gas barrier property and the thermal stability deteriorate.

In causing the epoxy compound (B) having a double bond to react with the unmodified EVOH (A), it is permissible to add an epoxy compound (E) having no double bond. By doing so, it is possible to reduce the crystallinity of the EVOH while minimizing the decrease in its gas barrier property and, as a result, to improve its performance such as stretchability, thermoformability, or flexibility. Specific examples of such an epoxy compound (E) are disclosed in WO 02/092643 (Patent document 7). Among the examples, monofunctional epoxy compounds having a molecular weight of 500 or less, such as epoxyethane (ethylene oxide), 1,2-epoxypropane (propylene oxide), 1,2-epoxybutane and glycidol, are preferred in view of performance. The epoxy compound (E) preferably has 2 to 8 carbon atoms.

A preferable melt flow rate (MFR) (measured at 190° C. under a load of 2160 g) of the modified EVOH (C) is 0.1 to 100 g/10 min, preferably 0.3 to 30 g/10 min, and more preferably 0.5 to 20 g/10 min. When a melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.

The method of adding an epoxy compound (E) having no double bond is not particularly restricted. From the viewpoint of production efficiency, however, it is preferable to perform the modification in the presence of all of an unmodified EVOH (A), an epoxy compound (B) having a double bond and an epoxy compound (E) having no double bond. Specifically, a method in which a mixture of an epoxy compound (B) having a double bond and an epoxy compound (E) having no double bond is added is provided as an example of a preferable method. In this method, it is more preferable to add a catalyst simultaneously.

The degree of modification with the epoxy compound (E) having no double bond is preferably within the range of from 0.1 mol % to 30 mol % based on the monomer units of the unmodified EVOH (A). The degree of modification with the epoxy compound (E) is more preferably 20 mol % or less, and even more preferably 15 mol % or less. There is a problem that when the degree of modification with the epoxy compound (E) increases, the gas barrier property decreases notably. From the viewpoint of improvement effects in stretchability, thermoformability, flexibility and the like, the degree of modification with an epoxy compound (E) is more preferably 0.5 mol % or more, and even more preferably 1 mol % or more.

By shaping a modified EVOH (C) obtained in such ways, the shaped article of the present invention is produced. At this time, it is permissible to incorporate a resin other than the modified EVOH (C) and various additives. In particular, to shape a resin composition prepared by incorporating an unmodified EVOH (D) to a modified EVOH (C) is a particularly preferable embodiment. Generally, the production cost of a modified EVOH (C) is higher than that of an unmodified EVOH (D). Therefore, it is economical to produce a resin composition having a desired double bond concentration by mixing a modified EVOH (C) having a double bond in a high concentration and an unmodified EVOH (D). Such a resin composition can be obtained easily because it is possible to produce a modified EVOH (C) with a high degree of modification easily by performing the reaction in an extruder by the aforementioned method. It is also easy to adjust the double bond concentration of the resin composition depending on the application. As the unmodified EVOH (D), substances may be used which are the same as those previously mentioned as the unmodified EVOH (A).

The blending weight ratio (C/D) in a resin composition containing a modified EVOH (C) and an unmodified EVOH (D) is not particularly limited. In order to obtain a shaped article excellent in hot water resistance by adjusting the double bond concentration of the resin composition to within a desired range, the lower limit of the ratio (C/D) is preferably 2/98, more preferably 5/95, even more preferably 15/85 or more, and particularly preferably 20/80 or more. On the other hand, from the viewpoint of production cost and barrier property, the upper limit of the ratio (C/D) is preferably 60/40, and more preferably 40/60.

The method of mixing a modified EVOH (C) and an unmodified EVOH (D) is not particularly restricted. They may be mixed by melt kneading or may be mixed in a solution. From the viewpoint of productivity, melt kneading is preferred. For example, melt kneading using pellets of a modified EVOH (C) and an unmodified EVOH (D) is a preferable embodiment.

The degree of modification with an epoxy compound (B) in a resin composition containing a modified EVOH (C) and an unmodified EVOH (D) is preferably within the range of 0.1 to 10 mol %, more preferably within the range of 0.3 to 5 mol %, and even more preferably within the range of 0.5 to 3 mol % based on the sum total of the monomer units of the EVOH (A) and the monomer units of the EVOH (D).

It is also permissible to incorporate various additives to a modified EVOH (C) or a resin composition containing a modified EVOH (C) and an unmodified EVOH (D) according to need. Examples of such additives include sensitizers, curing agents, curing accelerators, antioxidants, plasticizers, ultraviolet absorbers, antistatic agents, colorants, fillers or other high molecular compounds. These may be blended unless the effect of the present invention is impaired. The following are specific examples of such additives.

Sensitizer: benzoin, benzoin methyl ether, benzoin ethyl ether, benzoin propyl ether, benzyl diphenyl disulfide, tetramethylthiuram monosulfide, azobisbutyronitrile, dibenzyl, diacetyl, acetophenone, 2,2-diethoxyacetophenone, benzophenone, 2-chlorothioxanthone, 2-methylthioxanthone and the like.

Curing agent: methyl ethyl ketone peroxide, cyclohexane peroxide, cumene peroxide, benzoyl peroxide, dicumyl peroxide, tert-butyl perbenzoate and the like.

Curing accelerator: metal soaps such as cobalt 2-ethylhexanoate, cobalt naphthenate, manganese 2-ethylhexanoate and manganese naphthenate, amines such as methylaniline, dimethylaniline, diethylaniline, methyl-p-toluidine, dimethyl-p-toluidine, methyl-2-hydroxyethyl aniline and di-2-hydroxyethyl-p-toluidine, and salts thereof such as hydrochloric acid, acetates, sulfates and phosphates.

Antioxidant: 2,5-dibutyl-tert-butylhydroquinone, 2,6-di-tert-butyl-p-cresol, 4,4'-thiobis-(6-tert-butylphenol), 2,2'-methylene-bis-(4-methyl-6-butylphenol), octadecyl-3-(3',5'-di-tert-butyl-4'-hydroxyphenyl) propionate, 4,4'-thiobis-(6-tert-butylphenol) and the like.

Plasticizer: dimethyl phthalate, diethyl phthalate, dibutyl phthalate, waxes, liquid paraffin, phosphates and the like.

Ultraviolet absorber: ethylene-2-cyano-3,3'-diphenyl acrylate, 2-(2'-hydroxy-5'-methylphenyl)benzotriazole, 2-(2'-hydroxy-3'-tert-butyl-5'-methylphenyl)5-chlorotriazole, 2-hydroxy-4-methoxybenzophenone, (2,2'-dihydroxy-4-methoxybenzophenone and the like.

Antistatic agent: pentaerythritol monostearate, sorbitan monopalmitate, sulfated oleic acid, polyethylene oxide, carbowax and the like.

Colorant: carbonblack, phthalocyanine, quinacridon, azo pigments, titanium oxide, red ion oxide and the like.

Filler: glass fiber, mica, cerite, calcium silicate, aluminium silicate, calcium carbonate, silicon oxide, montmorillonite and the like.

In some cases, the resin composition of a modified EVOH added according to the above-mentioned purpose is processed into a film, a sheet or a shaped article by heat-melt shaping. In other cases, a method is used in which it is used as a coating agent by solution-coating it to the surface of a film, a sheet or a shaped article having another plastic or metal as a substrate. The conditions in such cases are described below.

By shaping a modified EVOH (C) or a resin composition containing a modified EVOH (C) and an unmodified EVOH (D), a shaped article of the present invention is obtained. The method of shaping is not particularly restricted. Melt shaping is available. Alternatively, it is permitted to obtain a shaped article by drying a solution. When performing melt shaping, it is permitted to use a modified EVOH (C) as it is without adding additives or, alternatively, it is also permitted to feed a modified EVOH (C), an unmodified EVOH (D) and various additives to an extruder, melt-kneading them, and shaping the mixture directly. Moreover, it is also permitted to perform shaping after melt kneading and pelletizing. A suitable method is adopted appropriately.

While the shaping temperature in melt shaping may vary depending upon the melting point of the modified EVOH or the like, the molten resin temperature is preferably adjusted to about 120° C. to 250° C.

As a melt shaping method, any shaping methods, such as an injection molding method, a compression molding method and an extrusion molding method, may be used. Among these, the extrusion molding method is exemplified by a T-die method, a hollow molding method, a pipe extrusion method, a linear extrusion method, a profiled die molding method, and an inflation method. A shaped article may be in any shape. It may be pellet, film, sheet, tape, bottle, pipe, filament, profiled extrudate, or the like. Moreover, it is possible to subject an extrusion molded article obtained by the extrusion molding method to secondary processing such as uniaxial or biaxial stretching and thermoforming.

Preferable embodiment of the present invention is a shaped article comprising a multilayer structure. Specifically, it is a shaped article comprising a multilayer structure having a layer comprising a modified EVOH (C) and a layer comprising a resin (F) other than the (C). Alternatively, it is a shaped article comprising a multilayer structure having a layer comprising a resin composition containing a modified EVOH (C) and an unmodified EVOH (D), and a layer comprising a resin (F) other than this resin composition.

The methods for producing shaped articles comprising such multilayer structures are not particularly restricted. They may be produced by melt-shaping or by lamination using an adhesive or the like or by coating of a solution. In the case of melt-shaping, coextrusion molding, coinjection molding, extrusion coating, and the like are used.

While the resin (F) is not particularly restricted, it is preferably a thermoplastic resin. While the resin (F) is not particularly restricted, an example thereof is at least one species selected from the group consisting of polyolefin, polyamide, polyester, polystyrene, polyurethane, polyvinylidene chloride, polyvinyl chloride, polyacrylonitrile, polycarbonate, an acrylic resin and a polyvinyl ester. Examples of the polyolefin include homo- or copolymers of olefins, such as low density polyethylene, medium density polyethylene, high density polyethylene, ethylene-vinyl acetate copolymers, ethylene-α-olefin (α-olefin having 3 to 20 carbon atoms) copolymers, ionomers, polypropylene, propylene-(α-olefin having 4 to 20 carbon atoms) copolymers, polybutene and polymethylpentene, or products obtained by graft-modifying these homo- or copolymers of olefins with an unsaturated carboxylic acid or its anhydride or ester. It is also preferable that the resin (F) is an elastomer.

When a layer of a modified EVOH resin (C) of the present invention or a layer comprising a resin composition containing a modified EVOH (C) and an unmodified EVOH (D) is indicated by C (C1, C2, . . . ) and a layer of a resin (F) is indicated by F (F1, F2, . . . ), and a layer of an adhesive which is formed according to need is indicated by Ad, the layer structure of a multilayer structure may be not only a two-layer structure of C/F but also any structure such as C/F/C, F/C/F, F1/F2/C, F/C/F/C/F, C2/C1/F/C1/C2, C/Ad/F, C/Ad/F/C, F/Ad/C/Ad/F or F/Ad/C/Ad/C/Ad/F if it is in a film-like, sheet-like or bottle-like shape. If it is in a filament-like shape, C and F may be in any combination such as a bimetal type, a core (C)-sheath (F) type, a core (F)-sheath (C) type or an eccentric core-sheath type. In some cases, a resin for improving adhesion between both resins is blended.

When a multilayer structure obtained by the extrusion molding method is a heat shrinkable film, the multilayer structure can be obtained by laminating layers by an extrusion lamination method, a dry lamination method, a coextrusion lamination method, a coextrusion sheet forming method, a coextrusion inflation method, a solution coating method, or the like. At this time, it is preferable that a layered material obtained by extrusion molding is rendered substantially amorphous as far as possible by immediately cooling rapidly. Subsequently, the layered material is heated again within a range not higher than the melting point of the modified EVOH of the present invention and stretched uniaxially or biaxially by a roll stretching method, a pantograph type stretching method, or an inflation stretching method.

When a modified EVOH (C) or a resin composition containing a modified EVOH (C) and an unmodified EVOH (D) is solution-coated on the surface of a shaped article, the modified EVOH resin composition is used by being dissolved or dispersed in a known solvent for an EVOH. Examples of the solvent include lower alcohols such as methanol, ethanol, n-propanol, isopropanol, n-butanol, 2-butanol, 2-methyl-2-propanol and benzyl alcohol, mixtures thereof with water, and solvents such as dimethyl sulfoxide, dimethylformamide, dimethylacetamide and N-methylpyrrolidone. In particular, mixed solvents of the aforementioned lower alcohol and water are preferable.

The substrate to which a modified EVOH (C) or a resin composition containing it is applied in the present invention is not particularly restricted and examples thereof include films, sheets, hollow containers of various kinds of plastic materials such as polyethylene, polypropylene, polyester and polyvinyl chloride, or paper, natural rubber, synthetic rubber, and metals.

As the method of application, any conventionally known method, such as a roller coating method, a spray coating method and a dip coating method, may be used.

Depending on the kind of the substrate, surface oxidation treatment, flame treatment, anchor coat treatment, primer treatment and the like may be performed appropriately in order to improve the adhesion force to a modified EVOH (C) or a resin composition containing it. Polyurethane-based compounds and polyester-isocyanate-based compounds can be used suitably as an anchor treating agent. The thickness of the anchor coat layer is preferably about 0.05 to 3 µM in a practical use aspect.

After applying a solution of a modified EVOH (C) or a resin composition containing it to a substrate, drying is carried out. The drying can be done by heating at a drying temperature of 30 to 150° C., preferably a temperature of about 50 to 120° C., for about 3 seconds to 5 minutes. When a crosslinking reaction, which is described later, is performed by irradiating with at least one kind of ray selected from the group consisting of electron beam, X-radiation, γ-radiation, ultraviolet radiation and visible radiation, it is preferable to perform drying at a low temperature or for a short period of time.

The shaped article of the present invention is characterized in that at least a part of the modified ethylene-vinyl alcohol copolymer (C) is crosslinked and a gel fraction of the shaped article is 3% by weight or more. It can be produced by crosslinking at least a part of the modified EVOH (C) in a shaped article obtained in the manner previously mentioned. While it is possible to crosslink the shaped article by leaving it in the air for a long period of time, it is usually preferable to perform the crosslinking by irradiating with at least one kind of ray selected from the group consisting of electron beam, X-radiation, γ-radiation, ultraviolet radiation and visible radiation or by heating.

In the case of using electron beam, X-radiation or γ-radiation, the absorbed dose is preferably 1 kGy or more. It is more preferably 1 kGy to 1 MGy, even more preferably 5 kGy to 500 kGy, and particularly preferably 10 kGy to 200 kGy. The case where the absorbed dose is greater than 1 MGy is unfavorable because decomposition of an EVOH occurs and this results in problems such as notable decrease in film strength and coloring. On the other hand, when the absorbed dose is less than 1 kGy, the gel fraction does not increase and desired performance such as hot water resistance fails to be obtained.

In the case of light irradiation, while the irradiation time is influenced by the thickness of a shaped article, the kind of light source and other conditions, and radiation for several minutes at most, usually for one minute or less, and in some cases for one second or less using a high-pressure mercury lamp, a low-pressure mercury lamp, a carbon-arc lamp, a xenon lamp, a metal halide lamp, an LED, or the like is much enough.

In the event that the shaped article of the present invention is a heat shrinkable film comprising a multilayer structure having a polyolefin resin layer, when electron beam crosslinking is performed before stretching, both the modified EVOH resin composition and the polyolefin resin are crosslinked. When stretching is performed after crosslinking, the stretching shapability, heat shrinking characteristics, mechanical strength, and the like are further improved.

When the multilayer structure of the present invention is characterized in that a content is filled and then heat sterilization treatment is performed, the aforementioned improvement in hot water resistance inhibits occurrence of whitening, deformation and decrease in barrier property. When the multi layer structure is used as a food packaging material, suitable applications thereof are lid materials, pouches, vacuum packaging, skin packs, deep-drawn packaging, rocket packaging, and the like. Moreover, besides film packaging, it exerts excellent performance as a container in a cup or tray form. It may also be shaped into a bottle or tube form.

By filling a content into the multilayer structure and then performing heat sterilization, especially boil sterilization or retort sterilization, a package excellent in preservability can be obtained. In the retort treatment, various methods, such as a recovery method, a substitution method, a steam method, a shower method and a spray method, may be used. While even the packaging material of the present invention may become whitened and opaque just after execution of retort treatment, it will return transparent when it is left at rest for a while after removal of water on the surface of the packaging material.

When more certain recovery of transparency and gas barrier property is desired, it is preferable to dry with a hot blast at 40 to 150° C. for 1 to 120 minutes. Another possible heat sterilization method is a hot filling method.

It is important that the shaped article obtained in such a manner, such as film, sheet, tape, bottle, pipe, filament or profiled extrudate, has an insoluble fraction in a water-phenol mixed solvent, namely gel fraction, of 3% by weight or more. When the insoluble fraction is less than 3% by weight, the effects on hot water resistance, heat resistance, and the like, which are objects of the present invention, will be reduced. The insoluble fraction is preferably 5% by weight or more, and more preferably 10% by weight or more. The insoluble fraction in a water-phenol mixed solvent is calculated by placing 1 part by weight of a shaped article in 100 parts by weight of a water (15% by weight)-phenol (85% by weight) mixed solvent, dissolving the article by heating at 60° C. for 12 hours, then filtering the mixture, and evaporating the filtrate to dryness. In the filtration, a filter material (filter paper, filter cloth, membrane) is used through which substantially 100% of a dissolved, uncrosslinked EVOH can pass. In the event that a filler is contained in the EVOH resin composition of the present invention, the gel fraction is calculated by subtracting the weight of a residue which remains after heating at 500° C. for 1 hour of the insoluble in the solvent. When the shaped article is a multilayer structure, the gel fraction of a modified EVOH (C) layer or a layer of a resin composition containing a modified EVOH (C) and an unmodified EVOH (D) is within the aforementioned range.

The application of the shaped article of the present invention ranges widely. Examples of preferable applications include an extrusion molded article, a film or a sheet (especially, a stretched film or a heat shrinkable film), a thermoformed article, a wallpaper or a decorative board, a pipe or a hose, a profile extruded article, an extrusion blow molded article, an injection molded article, a flexible packaging material, and a container (especially, a retort packaging container). When the shaped article is a multilayer structure, examples of preferable applications include a coextruded film or a coextruded sheet, a heat shrinkable film, a multilayer pipe (especially, a fuel pipe or a pipe for hot water circulation), a multilayer hose (especially, a fuel hose), a multilayer container (especially, a coextrusion blow molded container, a coinjection molded container, and a retort packaging container).

EXAMPLES

The invention will now be described in more detail with reference to the following Examples, but these Examples should not be construed to limit the invention at all. Evaluations were performed by the following methods.

(1) Ethylene Content of EVOH and Degree of Modification of Modified EVOH

A sample to be used for measurement is pulverized and low molecular weight components are extracted from it with acetone, followed by drying at 120° C. for 12 hours. The sample was subjected to 1H-NMR measurement, in which model "JNM-GX-500" manufactured by JEOL, Ltd. was used, using deuterated dimethyl sulfoxide as a solvent. In the resulting spectrum, calculation was carried out on the basis of the area ratio of a peak (5.9 ppm) of the methine positions of the double bonds or a peak (5.2 ppm) of the methylene positions of the double bonds in the modified EVOH with which an epoxy compound having a double bond reacted to a peak (1.4 ppm) of the ethylene moieties corresponding to the monomer units of an EVOH. The degrees of modification with epoxypropane disclosed in Synthesis Examples 4 and 6 were calculated on the basis of the area ratio of a peak (1.0 to 1.1 ppm) of a methyl group generated by a ring opening reaction of epoxypropane to a peak of the ethylene moiety of an EVOH.

(2) Melt Flow Rate (MFR) of EVOH and Modified EVOH

The flow rate (g/10 min) of a resin at a load of 2.16 kg and a temperature of 190° C. was measured using a Melt Indexer L260 (manufactured by TechnoSeven Co., Ltd.).

(3) Retort Aptitude (Monolayer)

After treatment of a crosslinked EVOH film in hot water at 120° C., 2 kg/cm$^2$ for 30 minutes or 90 minutes, the condition of the film was evaluated as follows.

A: The film did not dissolve in entirety.
B: The film dissolved in part.
C: The film dissolved in entirety, so that it failed to leave its form.

(4) Hot Water Breakage Temperature

A film-shaped sample was cut off so that it might be in a size of 15 cm in length and 5 mm in width. The thickness of the sample was measured and a weight was attached so that the load per cross section might be 10 g/mm$^2$. The sample was suspended in a water tank with a capacity of 5 L containing 4 L of warm water at 40° C. and then the water temperature was increased at a rate of 3° C./min under ordinary pressure. The water temperature at a time when the sample broke was determined as a hot water breakage temperature T (° C.). In the event that a sample did not break when one minute had lapsed since arrival of the water temperature at 100° C., the hot water breakage temperature T (° C.) was determined by the following method. The aforementioned weight was attached to the film-shaped sample. The sample was suspended in an autoclave with a capacity of 5 L containing 4 L of warm water at 40° C. and then the water temperature was increased at a rate of 3° C./min under ordinary pressure. The water temperature at a time when the sample broke was determined as a hot water breakage temperature T (° C.). In the event that a sample did not break when one minute had lapsed since arrival of the water temperature at 120° C., the hot water breakage temperature T (° C.) was determined as T>120° C.

Synthesis Example 1

A mixed solution was obtained by mixing 28 parts by weight of zinc acetylacetonato monohydrate and 957 parts by weight of 1,2-dimethoxyethane. To the resulting mixed solution, 15 parts by weight of trifluoromethane sulfonic acid was added under stirring to yield a catalyst solution.

Using a TEM-35BS extruder (37 mmφ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 300 rpm. An EVOH resin (ethylene content=32 mol %, MFR=6, potassium content=8 ppm, phosphate radical content=20 ppm) was added through a resin feeding port of C1, and allyl glycidyl ether and the catalyst solution were added at rates of 1.76 kg/hr and 0.2 kg/hr through a compression inlet of C5, respectively. A 0.82% aqueous sodium acetate solution was added at a rate of 0.3 kg/hr through a feeding port of C9. Surplus allyl glycidyl ether was removed through a vent of C11 by pressure reduction. Water was added through C12 at a rate of 1 kg/hr. Water and allyl glycidyl ether were removed through vents of C13 and C14 by pressure reduction. As a result of this, a modified EVOH having a degree of modification with allyl glycidyl ether of 1 mol % and an MFR of 2 g/10 min was obtained. The results obtained are summarized in Table 1.

Synthesis Example 2

Using a TEM-35BS extruder (37 mmφ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 300 rpm. An EVOH resin (ethylene content=32 mol %, MFR=6, potassium content=8 ppm, phosphate radical content=20 ppm) was added through a resin feeding port of C1, and allyl glycidyl ether and the catalyst solution were added at rates of 2.93 kg/hr and 0.5 kg/hr through a compression inlet of C5, respectively. A 0.82% aqueous sodium acetate solution was added at a rate of 0.6 kg/hr through a feeding port of C9. Surplus allyl glycidyl ether was removed through a vent of C11 by pressure reduction. Water was added through C12 at a rate of 1 kg/hr. Water and allyl glycidyl ether were removed through vents of C13 and C14 by pressure reduction. As a result of this, a modified EVOH having a degree of modification with allyl glycidyl ether of 2 mol % and an MFR of 2 g/10 min was obtained. The results obtained are summarized in Table 1.

Synthesis Example 3

Using a TEM-35BS extruder (37 mmφ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 300 rpm. An EVOH resin (ethylene content=44 mol %, MFR=6, potassium content=6 ppm, phosphate radical content=15 ppm) was added through a resin feeding port of C1, and allyl glycidyl ether and the catalyst solution were added at rates of 1.85 kg/hr and 0.2 kg/hr through a compression inlet of C5, respectively. A 0.82% aqueous sodium acetate solution was added at a rate of 0.3 kg/hr through a feeding port of C9. Surplus allyl glycidyl ether was removed through a vent of C11 by pressure reduction. Water was added through C12 at a rate of 1 kg/hr. Water and allyl glycidyl ether were removed through vents of C13 and C14 by pressure reduction. As a result of this, a modified EVOH having a degree of modification with allyl glycidyl ether of 1 mol % and an MFR of 2.5 g/10 min was obtained. The results obtained are summarized in Table 1.

Synthesis Example 4

Using a TEM-35BS extruder (37 mmφ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 350 rpm. An EVOH resin (ethylene content=32 mol %, MFR=6, potassium content=8 ppm, phosphate radical content=20 ppm) was added through a resin feeding port of C1. Allyl glycidyl ether, epoxypropane and the catalyst solution of Synthesis Example 1 were added at rates of 1.47 kg/hr, 2.69 kg/hr and 0.5 kg/hr through a compression inlet of C5, respectively. A 0.82% aqueous sodium acetate solution was added at a rate of 0.6 kg/hr through a feeding port of C9. Surplus allyl glycidyl ether and epoxypropane were removed through a vent of C11 by pressure reduction. Water was added through C12 at a rate of 1 kg/hr. Water, allyl glycidyl ether and epoxypropane were removed through vents of C13 and C14 by pressure reduction. As a result of this, a modified EVOH having a degree of modification with allyl glycidyl ether of 0.9 mol %, an epoxypropane content of 7.2 mol % and an MFR of 3 g/10 min was obtained. The results obtained are summarized in Table 1.

Synthesis Example 5

Using a TEM-35BS extruder (37 mmϕ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 300 rpm. An EVOH resin (ethylene content=44 mol %, MFR=6, potassium content=6 ppm, phosphate radical content=15 ppm) was added through a resin feeding port of C1, and allyl glycidyl ether and the catalyst solution were added at rates of 1.85 kg/hr and 0.2 kg/hr through a compression inlet of C5, respectively. A 0.82% aqueous sodium acetate solution was added at a rate of 0.3 kg/hr through a feeding port of C9. Surplus allyl glycidyl ether was removed through a vent of C11 by pressure reduction. Water was added through C12 at a rate of 1 kg/hr. Water and allyl glycidyl ether were removed through vents of C13 and C14 by pressure reduction. As a result of this, a modified EVOH having a degree of modification with allyl glycidyl ether of 1.1 mol % and an MFR of 2.5 g/10 min was obtained. The results obtained are summarized in Table 1.

Synthesis Example 6

Using a TEM-35BS extruder (37 mmϕ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 400 rpm. An EVOH resin (ethylene content=44 mol %, MFR=6, potassium content=6 ppm, phosphate radical content=15 ppm) was added through a resin feeding port of C1. Allyl glycidyl ether, epoxypropane and the catalyst solution of Synthesis Example 1 were added at rates of 1.54 kg/hr, 2.82 kg/hr and 0.5 kg/hr through a compression inlet of C5, respectively. A 0.82% aqueous sodium acetate solution was added at a rate of 0.6 kg/hr through a feeding port of C9. Surplus allyl glycidyl ether and epoxypropane were removed through a vent of C11 by pressure reduction. Water was added through C12 at a rate of 1 kg/hr. Water, allyl glycidyl ether and epoxypropane were removed through vents of C13 and C14 by pressure reduction. As a result of this, a modified EVOH having a degree of modification with allyl glycidyl ether of 0.8 mol %, an epoxypropane content of 7 mol % and an MFR of 3.5 g/10 min was obtained. The results obtained are summarized in Table 1.

Synthesis Example 7

Using a TEM-35BS extruder (37 mmϕ, L/D=52.5) manufactured by Toshiba Machine Co., Ltd., a screw constitution, vents and compression inlets were arranged as shown in FIG. 1. A barrel C1 was cooled with water. Barrels C2 to C15 were set at 200° C. The extruder was driven at a screw rotation speed of 265 rpm. An EVOH resin (ethylene content=32 mol %, MFR 1.6, potassium content=8 ppm, phosphate radical content=20 ppm) was added through a resin feeding port of C1, and allyl glycidyl ether and the catalyst solution were added at rates of 2.93 kg/hr and 0.3 kg/hr through a compression inlet of C5, respectively. A 0.82% aqueous sodium acetate solution was added at a rate of 0.4 kg/hr through a feeding port of C9. Surplus allyl glycidyl ether was removed through a vent of C11 by pressure reduction. Water was added through C12 at a rate of 1 kg/hr. Water and allyl glycidyl ether were removed through vents of C13 and C14 by pressure reduction. As a result of this, a modified EVOH resin having a degree of modification with allyl glycidyl ether of 1.5 mol % and an MFR of 0.8 g/10 min was obtained. The results obtained are summarized in Table 1.

Example 1

A film of 20 μm in thickness was obtained by melt-extruding the modified EVOH obtained in Synthesis Example 1, through a coat hanger die at 220° C. using a 20 ϕ single-screw extruder. This monolayer film was introduced into an electron beam irradiation machine (CURETRON, manufactured by Nisshin High-Voltage Ltd.) to be irradiated with an electron beam of 100 kGy (acceleration voltage=200 kV), so that the EVOH film was crosslinked. At this time, when the film was subjected to a heat-dissolving test at 60° C. for 12 hours using a mixed solvent having a water-to-phenol weight ratio (water/phenol) of 15/85, the film had a content of insoluble, i.e. gel fraction, of 92%. The oxygen gas transmission rate (OTR) of this irradiated film at 20° C., 85% RH was measured to be 5.5 cc·20 μm/m²·0.24 hr·atm. When the film was subjected to retort sterilization treatment at 120° C. for 30 minutes or 90 minutes, the form of the film was good. When the oxygen gas transmission rate (OTR) of the retort-treated film was measured at 20° C., 65% RH, it was 0.7 cc·20 μm/m²·24 hr·atm, so that the film showed good gas barrier property. The hot water breakage temperature T (° C.) was T>120° C. The results obtained are summarized in Table 2.

Example 2

A film was obtained in the same manner as in Example 1, except for changing the electron beam dose to 10 kGy. At this time, the gel fraction was 28%. When the film was subjected to retort sterilization treatment at 120° C. for 30 minutes, the form of the film was good. The hot water breakage temperature T (° C.) was T>120° C. The results obtained are summarized in Table 2.

Example 3

A film was obtained in the same manner as in Example 1, except for using the modified EVOH obtained in Synthesis Example 2. At this time, the gel fraction was 95%. When the film was subjected to retort sterilization treatment at 120° C. for 90 minutes, the form of the film was good. The hot water breakage temperature T (° C.) was T>120° C. The results obtained are summarized in Table 2.

Example 4

Using a 25 ϕ twin-screw extruder, 50 parts by weight of the modified EVOH obtained in Synthesis Example 1 and 50 parts by weight of an EVOH having an ethylene content of 32 mol %, a degree of saponification of 99.6% and an MFR of 1.6 g/10 min were pelletized. As a result of this, an EVOH resin composition having a degree of modification with allyl glycidyl ether of 0.5 mol % and an MFR of 1.9 g/10 min was obtained. Subsequently, a film of 20 μm in thickness was obtained by melt-extruding the EVOH resin composition, through a coat hanger die at 220° C. using a 20 single-screw extruder. This monolayer film was introduced into an electron beam irradiation machine (CURETRON, manufactured by Nisshin High-Voltage Ltd.) to be irradiated with an electron beam of 100 kGy (acceleration voltage=200 kV), so that the EVOH film was crosslinked. At this time, the gel fraction was 70%. When the film was subjected to retort sterilization treatment at 120° C. for 90 minutes, the form of the film was good. When the oxygen gas transmission rate (OTR) of the retort-treated film was measured at 20° C., 65% RH, it was 0.6 cc·20 μm/m²·0.24 hr·atm, so that the film showed good gas barrier property. The hot water breakage temperature T (° C.) was T>120° C. The results obtained are summarized in Table 2.

Example 5

An EVOH film was obtained in the same manner as in Example 4 using 50 parts by weight of the modified EVOH obtained in Synthesis Example 1 and 50 parts by weight of an EVOH (EVAL F101) having an ethylene content of 32 mol %, a degree of saponification of 99.6%, and an MFR of 1.6 g/10 min. Subsequently, the EVOH film was crosslinked by irradiating it with 30 kGy of electron beam. At this time, the gel fraction was 20%. The oxygen gas transmission rate (OTR) of this irradiated film at 20° C., 85% RH was measured to be 3.5 cc·20 μm/m²·0.24 hr·atm. When the film was subjected to retort sterilization treatment at 120° C. for 30 minutes, the form of the film was good. The hot water breakage temperature T (° C.) was T>120° C. The results obtained are summarized in Table 2.

Example 6

An EVOH film was crosslinked by performing the same operations as in Example 5, except for changing the electron beam dose to 15 kGy in Example 5. At this time, the gel fraction was 10%. The oxygen gas transmission rate (OTR) of this irradiated film at 20° C., 85% RH was measured to be 3.5 cc·20 μm/m²·0.24 hr·atm. When the film was subjected to retort sterilization treatment at 120° C. for 30 minutes, the form of the film was good. The hot water breakage temperature T (° C.) was T>120° C. The results obtained are summarized in Table 2.

Example 7

An EVOH film was obtained in the same manner as in Example 4 using 30 parts by weight of the modified EVOH obtained in Synthesis Example 4 and 70 parts by weight of an EVOH (EVAL F101) having an ethylene content of 32 mol %, a degree of saponification of 99.6%, and an MFR of 1.6 g/10 min. Subsequently, the EVOH film was crosslinked by irradiating it with 100 kGy of electron beam. At this time, the gel fraction was 33%. When the film was subjected to retort sterilization treatment at 120° C. for 30 minutes, the form of the film was good. The hot water breakage temperature T (° C.) was T>120° C. The results obtained are summarized in Table 2.

Example 8

An EVOH film was obtained in the same manner as in Example 4 using 30 parts by weight of the modified EVOH obtained in Synthesis Example 5 and 70 parts by weight of an EVOH (EVAL E105). Subsequently, the EVOH film was crosslinked by irradiating it with 100 kGy of electron beam. At this time, the gel fraction was 35%. When the film was subjected to retort sterilization treatment at 120° C. for 30 minutes, the form of the film was good. The hot water breakage temperature T (° C.) was T>120° C. The results obtained are summarized in Table 2.

Example 9

An EVOH film was obtained in the same manner as in Example 4 using 30 parts by weight of the modified EVOH obtained in Synthesis Example 6 and 70 parts by weight of an EVOH (EVAL E105). Subsequently, the EVOH film was crosslinked by irradiating it with 100 kGy of electron beam. At this time, the gel fraction was 28%. When the film was subjected to retort sterilization treatment at 120° C. for 30 minutes, the form of the film was good. The hot water breakage temperature T (° C.) was T>120° C. The results obtained are summarized in Table 2.

Example 10

An EVOH film was obtained in the same manner as in Example 4 using 25 parts by weight of the modified EVOH obtained in Synthesis Example 1 and 75 parts by weight of an EVOH having an ethylene content of 32 mol %. Subsequently, the EVOH film was crosslinked by irradiating it with 100 kGy of electron beam. At this time, the gel fraction was 40%. When the film was subjected to retort sterilization treatment at 120° C. for 90 minutes, the form of the film was good. The hot water breakage temperature T (° C.) was T>120° C. The results obtained are summarized in Table 2.

Example 11

An EVOH film was obtained in the same manner as in Example 4 using 25 parts by weight of the modified EVOH obtained in Synthesis Example 2 and 75 parts by weight of an EVOH having an ethylene content of 32 mol %. Subsequently, the EVOH film was crosslinked by irradiating it with 100 kGy of electron beam. At this time, the gel fraction was 70%. When the film was subjected to retort sterilization treatment at 120° C. for 90 minutes, the form of the film was good. The hot water breakage temperature T (° C.) was T>120° C. The results obtained are summarized in Table 2.

Example 12

An EVOH film was obtained in the same manner as in Example 4 using 25 parts by weight of the modified EVOH obtained in Synthesis Example 2 and 75 parts by weight of an EVOH having an ethylene content of 32 mol %. Subsequently, the EVOH film was crosslinked by irradiating it with 30 kGy of electron beam. At this time, the gel fraction was 25%. When the film was subjected to retort sterilization treatment at 120° C. for 90 minutes, the form of the film was good. The hot water breakage temperature T (° C.) was T>120° C. The results obtained are summarized in Table 2.

Example 13

An EVOH film was obtained in the same manner as in Example 4 using 25 parts by weight of the modified EVOH obtained in Synthesis Example 2 and 75 parts by weight of an EVOH having an ethylene content of 27 mol %. Subsequently, the EVOH film was crosslinked by irradiating it with 100 kGy of electron beam. At this time, the gel fraction was 70%. When the film was subjected to retort sterilization treatment at 120° C. for 90 minutes, the form of the film was good.

The hot water breakage temperature T (° C.) was T>120° C. The results obtained are summarized in Table 2.

Example 14

An EVOH film was obtained in the same manner as in Example 4 using 20 parts by weight of the modified EVOH obtained in Synthesis Example 1 and 80 parts by weight of an EVOH (EVAL F101). Subsequently, the EVOH film was crosslinked by irradiating it with 100 kGy of electron beam. At this time, the gel fraction was 27%. When the film was subjected to retort sterilization treatment at 120° C. for 30 minutes, the form of the film was good. The hot water breakage temperature T (° C.) was T>120° C. The results obtained are summarized in Table 2.

Example 15

An EVOH film was obtained in the same manner as in Example 4 using 20 parts by weight of the modified EVOH obtained in Synthesis Example 7 and 80 parts by weight of an EVOH (EVAL F101). Subsequently, the EVOH film was crosslinked by irradiating it with 100 kGy of electron beam. At this time, the gel fraction was 23%. When the film was subjected to retort sterilization treatment at 120° C. for 30 minutes, the form of the film was good. The hot water breakage temperature T (° C.) was T>120° C. The results obtained are summarized in Table 2.

Comparative Example 1

An EVOH film was obtained in the same manner as in Example 4 using 50 parts by weight of the modified EVOH obtained in Synthesis Example 1 and 50 parts by weight of an EVOH (EVAL F101) having an ethylene content of 32 mol %, a degree of saponification of 99.6%, and an MFR of 1.6 g/10 min. Subsequently, the EVOH film was crosslinked by irradiating it with 10 kGy of electron beam. At this time, the gel fraction was 2%. The oxygen gas transmission rate (OTR) of this irradiated film at 20° C., 85% RH was measured to be 3.6 cc·20 μm/m²·0.24 hr·atm. When the film was subjected to retort sterilization treatment at 120° C. for 30 minutes or 90 minutes, the film was dissolved partly. The results obtained are summarized in Table 2.

Comparative Example 2

A film of 20 μm in thickness was obtained by melt-extruding an EVOH (EVAL F101) having an ethylene content of 32 mol %, a degree of saponification of 99.6% and an MFR of 1.6 g/10 min, through a coat hanger die at 220° C. using a 20 φ single-screw extruder. This monolayer film was introduced into an electron beam irradiation machine (CURETRON, manufactured by Nisshin High-Voltage Ltd.) to be irradiated with an electron beam of 100 kGy (acceleration voltage=200 kV), so that the EVOH film was crosslinked. At this time, the gel fraction was 0%. The oxygen gas transmission rate (OTR) of this irradiated film at 20° C., 85% RH was measured to be 2.2 cc·20 μm/m²·24 hr·atm. The film was subjected to retort sterilization treatment at 120° C. for 30 minutes. As a result, the film was dissolved completely and lost its original form. The results obtained are summarized in Table 2.

Comparative Example 3

A film of 20 μm in thickness was obtained by melt-extruding the modified EVOH obtained in Synthesis Example 1, through a coat hanger die at 220° C. using a 20 φ single-screw extruder.

At this time, the gel fraction was 0%. The oxygen gas transmission rate (OTR) of this irradiated film at 20° C., 85% RH was measured to be 7 cc·20 μm/m²·24 hr·atm. The film was subjected to retort sterilization treatment at 120° C. for 30 minutes. As a result, the film was dissolved completely and lost its original form. The results obtained are summarized in Table 2.

Comparative Example 4

A film shaped article (30 μm in thickness) was produced by mixing 5 parts of allyl glycidyl ether and 0.15 parts of benzoin isopropyl ether to 100 parts of an EVOH having an ethylene content of 40 mol %, a degree of saponification of 99.5% and an MFR at 210° C. of 3.4 and then conducting melt-extrusion under the following conditions. This film was irradiated with light from a high-pressure mercury lamp (80 W/cm) at a distance of 10 cm for 5 seconds. The resulting film was evaluated for hot water breakage temperature and retort aptitude. The hot water breakage temperature was 95° C. As to the retort aptitude, the film was dissolved by the retort treatment and had lost its original form. The results obtained are summarized in Table 3.
Melt Extrusion Conditions
  Extruder: 40 mmφ single-screw extruder manufactured by Japan Steel Works, Ltd.
  Screw: L/D=28, compression ratio=3.2
  Die: fish tail die
  Extrusion temperature: 230° C. at the cylinder front 200° C. at the die Comparative Example 5

The film shaped article obtained in Comparative Example 4 was irradiated with an electron beam under the same conditions as in Example 1. The resulting film was evaluated for hot water breakage temperature and retort aptitude. The hot water breakage temperature was 98° C. As to the retort aptitude, the film was dissolved by the retort treatment and had lost its original form. The results obtained are summarized in Table 3.

Comparative Example 6

A film shaped article (30 μm in thickness) was produced by mixing 5 parts of ethylene glycol allyl glycidyl ether and 0.15 parts of benzoin isopropyl ether to 100 parts of an EVOH having an ethylene content of 25 mol %, a degree of saponification of 99.6% and an MFR at 210° C. of 3.5 and then conducting melt-extrusion under the same conditions as in Comparative Example 5. This film was irradiated with light from a high-pressure mercury lamp (80 W/cm) at a distance of 10 cm for 5 seconds. The resulting film was evaluated for hot water breakage temperature and retort aptitude. The hot water breakage temperature was 98° C. As to the retort aptitude, the film was dissolved by the retort treatment and had lost its original form. The results obtained are summarized in Table 3.

Comparative Example 7

The film shaped article obtained in Comparative Example 6 was irradiated with an electron beam under the same conditions as in Example 1. The resulting film was evaluated for hot water breakage temperature and retort aptitude. The hot water breakage temperature was 98° C. As to the retort aptitude, the film was dissolved by the retort treatment and had lost its original form. The results obtained are summarized in Table 3.

TABLE 1

| | starting EVOH | | Modification conditions | | | | | |
|---|---|---|---|---|---|---|---|---|
| | Ethylene content (mol %) | MFR (g/10 min) | Feed rate of resin (kg/hr) | Modifier 1*1 | Feed rate of modifier 1 (kg/hr) | Modifier 2*2 | Feed rate of modifier 2 (kg/hr) | Amount of catalyst*3 (kg/hr) |
| Synthesis Example 1 | 32 | 6.0 | 20 | AGE | 1.76 | — | — | 0.2 |
| Synthesis Example 2 | 32 | 6.0 | 20 | AGE | 2.93 | — | — | 0.5 |
| Synthesis Example 3 | 44 | 6.0 | 20 | AGE | 1.85 | — | — | 0.2 |
| Synthesis Example 4 | 32 | 6.0 | 20 | AGE | 1.47 | EP | 2.69 | 0.5 |
| Synthesis Example 5 | 44 | 6.0 | 20 | AGE | 1.85 | — | — | 0.2 |
| Synthesis Example 6 | 44 | 6.0 | 20 | AGE | 1.54 | EP | 2.82 | 0.5 |
| Synthesis Example 7 | 32 | 1.6 | 20 | AGE | 2.93 | — | — | 0.3 |

| | Modification conditions | | Analytical value of modified resin | | | |
|---|---|---|---|---|---|---|
| | Amount of deactivator*4 (kg/hr) | Screw rotation speed (rpm) | Degree of modification with AGE (mol %) | Degree of modification of EP (mol %) | MFR (g/10 min) | Melting point (° C.) |
| Synthesis Example 1 | 0.3 | 300 | 1.0 | 0 | 2.0 | 171 |
| Synthesis Example 2 | 0.6 | 300 | 2.0 | 0 | 2.0 | 166 |
| Synthesis Example 3 | 0.3 | 300 | 1.0 | 0 | 2.5 | 154 |
| Synthesis Example 4 | 0.6 | 350 | 0.9 | 7.2 | 3.0 | — |
| Synthesis Example 5 | 0.3 | 300 | 1.1 | 0 | 2.5 | — |
| Synthesis Example 6 | 0.6 | 400 | 0.8 | 7.0 | 3.5 | — |
| Synthesis Example 7 | 0.4 | 265 | 1.5 | 0 | 0.8 | — |

*1AGE: allyl glycidyl ether
*2EP: epoxy propane
*3Zinc acetylacetonato (0.1 mol/kg)/trifluoromethane sulfonic acid (0.1 mol/kg)/1,2-dimethoxyethane solution
*4 0.1 mol/kg Aqueous sodium acetate solution

TABLE 2

| | Resin constitution | | | | Degree of modification with AGE (mol %) | Melting point (° C.) | MFR 190° C. |
|---|---|---|---|---|---|---|---|
| | Modified EVOH | Part by weight | EVOH | Part by weight | | | |
| Example 1 | Synthesis Example 1 | 100 | — | — | — | — | — |
| Example 2 | Synthesis Example 1 | 100 | — | — | — | — | — |
| Example 3 | Synthesis Example 4 | 100 | — | — | — | — | — |
| Example 4 | Synthesis Example 1 | 50 | Ethylene content 32 mol % | 50 | 0.5 | 177 | 1.9 |
| Example 5 | Synthesis Example 1 | 50 | EVAL F101 | 50 | — | — | — |
| Example 6 | Synthesis Example 1 | 50 | EVAL F101 | 50 | — | — | — |
| Example 7 | Synthesis Example 4 | 30 | EVAL F101 | 70 | — | — | — |
| Example 8 | Synthesis Example 5 | 30 | EVAL E105 | 70 | — | — | — |
| Example 9 | Synthesis Example 6 | 30 | EVAL E105 | 70 | — | — | — |
| Example 10 | Synthesis Example 1 | 25 | Ethylene content 32 mol % | 75 | 0.25 | 180 | 1.9 |
| Example 11 | Synthesis Example 2 | 25 | Ethylene content 32 mol % | 75 | 0.5 | 178 | 1.8 |
| Example 12 | Synthesis Example 2 | 25 | Ethylene content 32 mol % | 75 | 0.5 | 178 | 1.8 |

TABLE 2-continued

| | | | | | | |
|---|---|---|---|---|---|---|
| Example 13 | Synthesis Example 2 | 25 | Ethylene content 27 mol % | 75 | 0.5 | 187 | 1.3 |
| Example 14 | Synthesis Example 1 | 20 | EVAL F101 | 80 | — | — | — |
| Example 15 | Synthesis Example 7 | 20 | EVAL F101 | 80 | — | — | — |
| Comparative Example 1 | Synthesis Example 1 | 50 | EVAL F101 | 50 | — | — | — |
| Comparative Example 2 | — | — | EVAL F101 | 100 | — | — | — |
| Comparative Example 3 | Synthesis Example 1 | 100 | — | — | — | — | — |

| | EB dose (kGy) | Gel fraction (%) | Retort resistance | OTR 20° C., 85% RH | OTR 20° C., 65% RH | Hot water breakage temperature (° C.) |
|---|---|---|---|---|---|---|
| Example 1 | 100 | 92 | A | 5.5 | 0.7 | T > 120 |
| Example 2 | 10 | 28 | A | 6.8 | — | T > 120 |
| Example 3 | 100 | 95 | A | — | 0.9 | T > 120 |
| Example 4 | 100 | 70 | A | — | 0.6 | T > 120 |
| Example 5 | 30 | 20 | A | 3.5 | — | T > 120 |
| Example 6 | 15 | 10 | A | 3.5 | — | T > 120 |
| Example 7 | 100 | 33 | A | 4.0 | — | T > 120 |
| Example 8 | 100 | 35 | A | 6.0 | — | T > 120 |
| Example 9 | 100 | 28 | A | 7.2 | — | T > 120 |
| Example 10 | 100 | 40 | A | — | 0.6 | T > 120 |
| Example 11 | 100 | 70 | A | — | 0.6 | T > 120 |
| Example 12 | 30 | 25 | A | — | 0.7 | T > 120 |
| Example 13 | 100 | 70 | A | — | 0.4 | T > 120 |
| Example 14 | 100 | 27 | A | 2.4 | — | T > 120 |
| Example 15 | 100 | 23 | A | 2.3 | — | T > 120 |
| Comparative Example 1 | 10 | 2 | B | 3.6 | — | — |
| Comparative Example 2 | 100 | 0 | C | 2.2 | — | — |
| Comparative Example 3 | — | 0 | C | 7.0 | — | — |

TABLE 3

| | Blending composition | | | | UV irradiation High-pressure mercury lamp (80 W/cm) | EB dose (kGy) | Gel fraction (%) | Retort resistance | Hot water breakage temperature (° C.) |
|---|---|---|---|---|---|---|---|---|---|
| | EVOH | Part by weight | Epoxy compound | Part by weight | | | | | |
| Comparative Example 4 | Ethylene content 40 mol % | 100 | Allyl glycidyl ether | 5 | Irradiated for 5 sec. | — | 0 | C | 95 |
| Comparative Example 5 | Ethylene content 40 mol % | 100 | Allyl glycidyl ether | 5 | — | 100 | 0 | C | 98 |
| Comparative Example 6 | Ethylene content 25 mol % | 100 | Ethylene glycol allyl glycidyl ether | 5 | Irradiated for 5 sec. | — | 0 | C | 98 |
| Comparative Example 7 | Ethylene content 25 mol % | 100 | Ethylene glycol allyl glycidyl ether | 5 | — | 100 | 0 | C | 98 |

Example 16

For converting the irradiated film obtained in Example 11 into a multilayer structure, an oriented nylon film (ON) and a non-oriented polypropylene film (CPP) were dry-laminated on both sides of an EVOH composition layer with an adhesive for anchor coat (Ac). A bag having three sides heat-sealed was produced from the multilayer film. After feeding water, the rest one side was heat-sealed to hermetically close the bag. Then, retort sterilization treatment was carried out at 120° C. for 90 minutes. As a result, no delamination of the intermediate layer and the inner and outer layers was recognized and the transparency of the intermediate layer was maintained. When the oxygen gas transmission rate of the retort-treated multilayer film was measured at 20° C., 65% RH/100% RH, it was 0.6 cc·20 μm/m²·0.24 hr·atm, so that the film showed good gas barrier property. The results obtained are summarized in Table 4.

Example 17

For converting the irradiated film obtained in Example 11 into a multilayer structure, non-oriented polypropylene films (CPP) were dry-laminated on both sides of an EVOH composition layer with an adhesive for anchor coat (Ac). A bag having three sides heat-sealed was produced from the multilayer film. After feeding water, the rest one side was heat-sealed to hermetically close the bag. Then, retort sterilization treatment was carried out at 120° C. for 90 minutes. As a result, no delamination of the intermediate layer and the inner and outer layers was recognized and the transparency of the intermediate layer was maintained. When the oxygen gas transmission rate of the retort-treated multilayer film was measured at 20° C., 65% RH/100% RH, it was 1.0 cc·20 μm/m²·-24 hr·atm, so that the film showed good gas barrier property. The results obtained are summarized in Table 4.

Comparative Example 8

For converting the irradiated film obtained in Comparative Example 1 into a multilayer structure, an oriented nylon film (ON) and a non-oriented polypropylene film (CPP) were dry-laminated on both sides of an EVOH composition layer with an adhesive for anchor coat. A bag having three sides heat-sealed was produced from the multilayer film. After feeding water, the rest one side was heat-sealed to hermetically close the bag. When it was subjected to retort sterilization treatment at 120° C. for 90 minutes, delamination was found in a part of the film. The results obtained are summarized in Table 4.

TABLE 4

| | Constitution | Retort aptitude | OTR after retort treatment 60% RH/100% RH |
|---|---|---|---|
| Example 16 | ON/Ac/Example 10/Ac/CPP | A | 0.6 |
| Example 17 | CPP/Ac/Example 10/Ac/CPP | A | 1 |
| Comparative Example 8 | ON/Ac/Comparative Example 1/Ac/CPP | B | — |

Example 18

A film of 150 μm in thickness was obtained by melt-extruding the modified EVOH obtained in Synthesis Example 3, through a coat hanger die at 200° C. using a 20 φ single-screw extruder. This monolayer film was introduced into an electron beam irradiation machine (CURETRON, manufactured by Nisshin High-Voltage Ltd.) to be irradiated with an electron beam of 100 kGy (acceleration voltage=250 kV), so that the EVOH film was crosslinked. This film was fed to a pantograph type biaxial stretching machine to be subjected to simultaneous biaxial stretching at a 3×3 stretch ratio at 80° C. When the stretched film was immersed in hot water at 90° C. and then its heat shrinkability was measured, the shrinkage percentage was high. In addition, neither unevenness nor breakage was found in the film and the appearance of the film was good. The results obtained are summarized in Table 5.

Comparative Example 9

A film of 150 μm in thickness was obtained by melt-extruding an EVOH having an ethylene content of 44 mol %, a degree of saponification of 99.6% and an MFR of 5.5 g/10 min, through a coat hanger die at 200° C. using a 20 single-screw extruder. This monolayer film was introduced into an electron beam irradiation machine (CURETRON, manufactured by Nisshin High-Voltage Ltd.) to be irradiated with an electron beam of 100 kGy (acceleration voltage=250 kV). This film was fed to a pantograph type biaxial stretching machine to be subjected to simultaneous biaxial stretching at a 3×3 stretch ratio at 80° C. When the stretched film was immersed in hot water at 90° C. and then its heat shrinkability at 90° C. was measured, the shrinkage percentage was not so high and a part of the film broke. The results obtained are summarized in Table 5.

TABLE 5

| | | Hot water shrinkage (90° C.) | |
|---|---|---|---|
| | Brand | Appearance | Shrinkage percentage |
| Example 18 | Synthesis Example 3 | A | High |
| Comparative example 9 | E105 | B | Medium |

Example 19

A multilayer sheet was produced by feeding the modified EVOH of Synthesis Example 3 to a three-kind five-layer coextrusion machine. The multilayer sheet has a structure in which PE resin layers (produced by Ube Industries, Ltd.; UMERIT 1520F, linear low density polyethylene) each having a thickness of 300 μM are arranged as outermost layers, adhesive resin layers (produced by Mitsui Chemicals, Inc.; ADMER NF587, acid-modified polyethylene resin "Tie") each having a thickness of 50 μm are disposed inside the aforementioned layers, and a layer of the above-mentioned modified EVOH resin having a thickness of 50 μm is disposed at the inner layer center. This multilayer sheet was introduced into an electron beam irradiation machine (CURETRON, manufactured by Nisshin High-Voltage Ltd.) to be irradiated with an electron beam of 100 kGy (acceleration voltage=250 kV), and then was irradiated with an electron beam of the same acceleration voltage and absorbed dose from the opposite side. The multilayer sheet was thereby crosslinked. This multilayer sheet was fed to a pantograph type biaxial stretching machine to be subjected to simultaneous biaxial stretching at a 3×3 stretch ratio at 90° C. When the multilayer stretched film was immersed into hot water at 90° C. and then its heat shrinkability was measured, the shrinkage percentage was high. In addition, neither unevenness nor breakage was found in the film and the appearance of the film was good. The results obtained are summarized in Table 6.

Comparative Example 10

A multilayer sheet was produced by feeding an EVOH having an ethylene content of 44 mol %, a degree of saponification of 99.6% and an MFR of 5.5 g/10 min to a three-kind five-layer coextrusion machine. The multilayer sheet has a structure in which PE resin layers (produced by Ube Industries, Ltd.; UMERIT 1520F, linear low density polyethylene) each having a thickness of 300 μm are arranged as outermost layers, adhesive resin layers (produced by Mitsui Chemicals, Inc.; ADMER NF587, acid-modified polyethylene resin "Tie") each having a thickness of 50 μm are disposed inside the aforementioned layers, and a layer of the above-mentioned EVOH resin having a thickness of 50 μm is disposed at the inner layer center. This multilayer sheet was introduced into an electron beam irradiation machine (CURETRON, manufactured by Nisshin High-Voltage Ltd.) to be irradiated with an electron beam of 100 kGy (acceleration voltage=250 kV), and then was irradiated with an electron beam of the same acceleration voltage and absorbed dose from the opposite side. This multilayer sheet was fed to a pantograph type biaxial stretching machine to be subjected to simultaneous biaxial stretching at a 3×3 stretch ratio at 90° C. When the multilayer stretched film was immersed into hot water at 90° C. and then its heat shrinkability was measured, the shrinkage percentage was not so high. In addition, unevenness and local thickness irregularity were found in the film. The results obtained are summarized in Table 6.

TABLE 6

| | | Hot water shrinkage (90° C.) | |
|---|---|---|---|
| | Constitution | Appearance | Shrinkage percentage |
| Example 19 | Crosslinked PE/Tie/Synthesis Example 3/Tie/Crosslinked PE | A | High |
| Comparative Example 10 | Crosslinked PE/Tie/E105/Tie/Crosslinked PE | B | Medium |

The invention claimed is:

1. A shaped article comprising a modified ethylene-vinyl alcohol copolymer (C), wherein
the modified ethylene-vinyl alcohol copolymer (C) is a product obtained by modifying an unmodified ethylene-vinyl alcohol copolymer (A) with an epoxy compound (B) having a monosubstituted olefin, a disubstituted olefin, or a trisubstituted olefin,
the modified ethylene-vinyl alcohol copolymer (C) has a monosubstituted olefin, a disubstituted olefin, or a trisubstituted olefin,
a degree of modification with the epoxy compound (B) is 0.5 to 3 mol % based on the monomer units of the ethylene-vinyl alcohol copolymer (A),
at least a part of the modified ethylene-vinyl alcohol copolymer (C) is crosslinked, and
a gel fraction of the shaped article is 10% by weight or more.

2. A shaped article comprising a resin composition containing a modified ethylene-vinyl alcohol copolymer (C) and an unmodified ethylene-vinyl alcohol copolymer (D), wherein
the modified ethylene-vinyl alcohol copolymer (C) is a product obtained by modifying an unmodified ethylene-vinyl alcohol copolymer (A) with an epoxy compound (B) having a monosubstituted olefin, a disubstituted olefin, or a trisubstituted olefin,
the modified ethylene-vinyl alcohol copolymer (C) has a monosubstituted olefin, a disubstituted olefin, or a trisubstituted olefin,
a degree of modification with the epoxy compound (B) is 0.5 to 3 mol % based on the monomer units of the ethylene-vinyl alcohol copolymer (A),
at least a part of the modified ethylene-vinyl alcohol copolymer (C) is crosslinked, and
a gel fraction of the shaped article is 10% by weight or more.

3. The shaped article according to claim 1, wherein the unmodified ethylene-vinyl alcohol copolymer (A) has an ethylene content of 5 to 55 mol % and a degree of saponification of 90% or more.

4. The shaped article according to claim 1, wherein the epoxy compound (B) having a double bond is a monofunctional epoxy compound having a molecular weight of 500 or less.

5. The shaped article according to claim 4, wherein the epoxy compound (B) having a double bond is allyl glycidyl ether.

6. The shaped article according to claim 1, wherein
the modified ethylene-vinyl alcohol copolymer (C) is a product obtained by modifying the unmodified ethylene-vinyl alcohol copolymer (A) with the epoxy compound (B) having a double bond and an epoxy compound (E) having no double bond,
the degree of modification with the epoxy compound (B) is 0.5 to 3 mol % based on the monomer units of the ethylene-vinyl alcohol copolymer (A), and
a degree of modification with the epoxy compound (E) is 0.1 to 30 mol % based on the monomer units of the ethylene-vinyl alcohol copolymer (A).

7. The shaped article according to claim 1, wherein the gel fraction is 20% by weight or more.

8. The shaped article according to claim 1, wherein the article is an extrusion molded article.

9. The shaped article according to claim 1, wherein the article is a film or a sheet.

10. The shaped article according to claim 9, wherein the article is a stretched film.

11. The shaped article according to claim 9, wherein the article is a heat shrinkable film.

12. The shaped article according to claim 1, wherein the article is a thermoformed article.

13. The shaped article according to claim 1, wherein the article is a wallpaper or a decorative board.

14. The shaped article according to claim 1, wherein the article is a pipe or a hose.

15. The shaped article according to claim 1, wherein the article is a profile extruded article.

16. The shaped article according to claim 1, wherein the article is an extrusion blow molded article.

17. The shaped article according to claim 1, wherein the article is an injection molded article.

18. The shaped article according to claim 1, wherein the article is a flexible packaging material.

19. The shaped article according to claim 1, wherein the article is a container.

20. The shaped article according to claim 19, wherein the article is a retort packaging container.

21. A package produced by filling a content into the shaped article according to claim 19 and then performing heat sterilization treatment.

22. The shaped article according to claim 1, wherein the article comprises a multilayer structure having a layer comprising the modified ethylene-vinyl alcohol copolymer (C) and a layer comprising a resin (F) other than the copolymer (C).

23. The shaped article according to claim 2, wherein the article comprises a multilayer structure having a layer comprising a resin composition containing the modified ethylene-vinyl alcohol copolymer (C) and the unmodified ethylene-vinyl alcohol copolymer (D), and a layer comprising a resin (F) other than the resin composition.

24. The shaped article according to claim 22, wherein the resin (F) is at least one selected from the group consisting of polyolefin, polyamide, polyester, polystyrene, polyurethane, polyvinylidene chloride, polyvinyl chloride, polyacrylonitrile, polycarbonate, an acrylic resin and a polyvinyl ester.

25. The shaped article according to claim 22, wherein the resin (F) is an elastomer.

26. The shaped article according to claim 22, wherein the article is a coextruded film or a coextruded sheet.

27. The shaped article according to claim 22, wherein the article is a heat shrinkable film.

28. The shaped article according to claim 22, wherein the article is a multilayer pipe.

29. The shaped article according to claim 28, wherein the multilayer pipe is a fuel pipe or a pipe for hot water circulation.

30. The shaped article according to claim 22, wherein the article is a multilayer hose.

31. The shaped article according to claim 30, wherein the multilayer hose is a fuel hose.

32. The shaped article according to claim 22, wherein the article is a multilayer container.

33. The shaped article according to claim 22, wherein the article is a coextrusion blow molded container.

34. The shaped article according to claim 22, wherein the article is a coinjection molded container.

35. The shaped article according to claim 32, wherein the article is a retort packaging container.

36. A package produced by filling a content into the shaped article according to claim 32 and then performing heat sterilization treatment.

37. A method for producing the shaped article according to claim 1, comprising modifying an unmodified ethylene-vinyl alcohol copolymer (A) with an epoxy compound (B) having a monosubstituted olefin, a disubstituted olefin, or a trisubstituted olefin to produce a modified ethylene-vinyl alcohol copolymer (C) having a monosubstituted olefin, a disubstituted olefin, or a trisubstituted olefin, shaping the modified ethylene-vinyl alcohol copolymer (C) to obtain a shaped article, and then crosslinking at least a part of the modified ethylene-vinyl alcohol copolymer (C) to make the shaped article having a gel fraction of 10% by weight or more.

38. A method for producing a shaped article according to claim 2, comprising modifying an unmodified ethylene-vinyl alcohol copolymer (A) with an epoxy compound (B) having a monosubstituted olefin, a disubstituted olefin, or a trisubstituted olefin to produce a modified ethylene-vinyl alcohol copolymer (C) having a monosubstituted olefin, a disubstituted olefin, or a trisubstituted olefin, producing a resin composition by mixing the modified ethylene-vinyl alcohol copolymer (C) and the unmodified ethylene-vinyl alcohol copolymer (D), shaping the resin composition to obtain a shaped article, and then crosslinking at least a part of the modified ethylene-vinyl alcohol copolymer (C) to make the shaped article having a gel fraction of 10% by weight or more.

39. The method for producing a shaped article according to claim 37, wherein the unmodified ethylene-vinyl alcohol copolymer (A) has an ethylene content of 5 to 55 mol % and a degree of saponification of 90% or more.

40. The method for producing a shaped article according to claim 37, wherein the epoxy compound (B) having a double bond is a monofunctional epoxy compound having a molecular weight of 500 or less.

41. The method for producing a shaped article according to claim 40, wherein the epoxy compound (B) having a double bond is allyl glycidyl ether.

42. The method for producing a shaped article according to claim 37, wherein
the modified ethylene-vinyl alcohol copolymer (C) is a product obtained by modifying the unmodified ethylene-vinyl alcohol copolymer (A) with the epoxy compound (B) having a double bond and an epoxy compound (E) having no double bond,
a degree of modification with the epoxy compound (B) is 0.5 to 3 mol % based on the monomer units of the ethylene-vinyl alcohol copolymer (A), and
a degree of modification with the epoxy compound (E) is 0.1 to 30 mol % based on the monomer units of the ethylene-vinyl alcohol copolymer (A).

43. The method for producing a shaped article according to claim 42, wherein the unmodified ethylene-vinyl alcohol copolymer (A) is modified in the presence of both the epoxy compound (B) having a double bond and the epoxy compound (E) having no double bond.

44. The method for producing a shaped article according to claim 37, wherein the modification is performed in the presence of a catalyst.

45. The method for producing a shaped article according to claim 37, wherein the unmodified ethylene-vinyl alcohol copolymer (A) has an alkali metal salt content of 50 ppm or less in terms of metal element.

46. The method for producing a shaped article according to claim 37, wherein the unmodified ethylene-vinyl alcohol copolymer (A) has an alkaline earth metal salt content of 20 ppm or less in terms of metal element.

47. The method for producing a shaped article according to claim 37, wherein the epoxy compound (B) is an epoxy compound having 4 to 10 carbon atoms.

48. The method for producing a shaped article according to claim 37, wherein a reaction between the unmodified ethylene-vinyl alcohol copolymer (A) and the epoxy compound (B) is performed in an extruder.

49. The method for producing a shaped article according to claim 48, wherein the epoxy compound (B) is added to the unmodified ethylene-vinyl alcohol copolymer (A) in a molten state in the extruder.

50. The method for producing a shaped article according to claim 37, wherein at least a part of the modified ethylene-vinyl alcohol copolymer (C) is crosslinked by irradiating with at least one kind of ray selected from the group consisting of electron beam, X-radiation, γ-radiation, ultraviolet radiation and visible radiation, or by heating.

51. The method for producing a shaped article according to claim 50, wherein the electron beam is irradiated so that the absorbed dose thereof will be 1 kGy or more.

52. The method for producing a shaped article according to claim 51, wherein the electron beam is irradiated so that the absorbed dose thereof will be 5 to 500 kGy.

53. The shaped article according to claim 1, wherein the epoxy compound (B) has a vinyl group and the modified ethylene-vinyl alcohol copolymer (C) has a vinyl group.

54. The shaped article according to claim 2, wherein the epoxy compound (B) has a vinyl group and the modified ethylene-vinyl alcohol copolymer (C) has a vinyl group.

* * * * *